(12) United States Patent
Guo et al.

(10) Patent No.: US 12,540,815 B2
(45) Date of Patent: Feb. 3, 2026

(54) IMAGE CORRELATION FOR END-TO-END DISPLACEMENT AND STRAIN MEASUREMENT

(71) Applicant: Northwestern University, Evanston, IL (US)

(72) Inventors: Ping Guo, Northfield, IL (US); Ru Yang, Evanston, IL (US)

(73) Assignee: Northwestern University, Evanston, IL (US)

( * ) Notice: Subject to any disclaimer, the term of this patent is extended or adjusted under 35 U.S.C. 154(b) by 271 days.

(21) Appl. No.: 17/953,033

(22) Filed: Sep. 26, 2022

(65) Prior Publication Data

US 2023/0099872 A1    Mar. 30, 2023

Related U.S. Application Data

(60) Provisional application No. 63/248,896, filed on Sep. 27, 2021.

(51) Int. Cl.
*G01B 11/16* (2006.01)
*G06T 3/18* (2024.01)
(Continued)

(52) U.S. Cl.
CPC ............... *G01B 11/16* (2013.01); *G06T 3/18* (2024.01); *G06T 7/0002* (2013.01); *G06T 7/62* (2017.01);
(Continued)

(58) Field of Classification Search
CPC ......... G01B 11/16; G06T 3/18; G06T 7/0002; G06T 7/62; G06T 2207/10016;
(Continued)

(56) References Cited

U.S. PATENT DOCUMENTS

2007/0297696 A1*  12/2007  Hamza .................. G06T 7/33
                                                382/294
2021/0312642 A1*  10/2021  Zhang ................... G06F 18/22

FOREIGN PATENT DOCUMENTS

CN         111815510 A    *  10/2020

OTHER PUBLICATIONS

Min, H.-G., On, H.-I., Kang, D.-J., Park, J.-H., 2019. "Strain measurement during tensile testing using deep learning-based digital image correlation," *Measurement Science and Technology* (2020), vol. 31, No. 1, 015014.

(Continued)

*Primary Examiner* — Md M Rahman
(74) *Attorney, Agent, or Firm* — Bell & Manning, LLC

(57) ABSTRACT

A system for correlating image data includes a memory configured to store a sequence of images of a sample. The system also includes a processor operatively coupled to the memory and configured to crop a first pair of images to specify a region of interest in the first pair of images, where at least one image in the pair of images is from the sequence of images. The processor is also configured to calculate, using a first convolutional neural network, a displacement field for the first pair of images. The processor is also configured to calculate, using a second convolutional neural network, a strain field for the first pair of images. The processor is further configured to determine an amount of displacement or deformation of the sample based at least in part on the displacement field and the strain field.

19 Claims, 34 Drawing Sheets

(51) Int. Cl.
    *G06T 7/00*      (2017.01)
    *G06T 7/62*      (2017.01)
    *G06V 10/82*     (2022.01)

(52) U.S. Cl.
    CPC .... *G06V 10/82* (2022.01); *G06T 2207/10016* (2013.01); *G06T 2207/20081* (2013.01); *G06T 2207/20132* (2013.01); *G06T 2207/20164* (2013.01)

(58) Field of Classification Search
    CPC . G06T 2207/20081; G06T 2207/20132; G06T 2207/20164; G06T 2207/20084; G06T 7/20; G06V 10/82; G06V 10/42; G06V 10/7747
    USPC ...................................................... 356/243.1
    See application file for complete search history.

(56) References Cited

OTHER PUBLICATIONS

Boukhtache, S., Abdelouahab, K., Berry, F., Blaysat, B., Grediac, M., Sur, F., "When Deep Learning Meets Digital Image Correlation,". Jan. 2021, Optics *and Lasers in Engineering* vol. 136, 106308.

\* cited by examiner

Fig. 1A                    Fig. 1B

Speckle pattern generation algorithm.

Output: Image $I_{512 \times 512}$ with randomly generated speckle patterns
1. Define a random density number    $n \in [2,000, 4,500]$
2. Define random ellipse center positions    $P_{n \times 2} \leftarrow (x_i, y_i), i = 1, 2, ..., n$    $x_i, y_i \in [0, 511]$
3. Define random long and short axis lengths    $B_{n \times 2} \leftarrow (l_i, s_i), i = 1, 2, ..., n$    $l_i, s_i \in [1.2, 6.0]$
4. Define random gray scale values    $G_{n \times 1} \leftarrow g_i, i = 1, 2, ..., n$    $g_i \in [0.08, 0.90]$
5. for $j \leftarrow 1$ to $n$ do
   $I[x,y] \leftarrow g_j, (x-P[j,1])^2/B[j,1]^2 + (y-P[j,2])^2/B[j,2]^2 < 1$
   end for
6. Apply Gaussian blur to $I_{512 \times 512}$.

Sparse patterns:    $l_i, s_i \in [1.2, 3.5]$
Large speckles:    Add 1–5 random ellipses with long and short axis lengths between [6.5, 9.5] after steps 1-5
Extra noise:    Add Gaussian noises with an intensity [0.001–0.01]
Low contrast:    $g_i \in [0.08, 0.60]$

Fig. 5

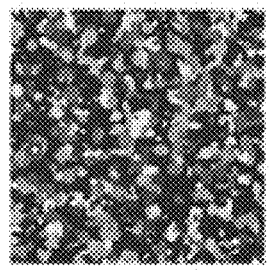
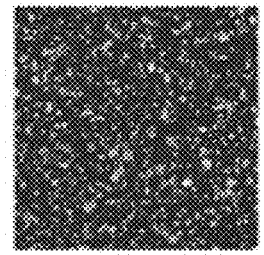
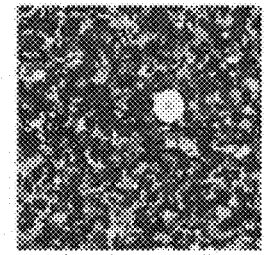
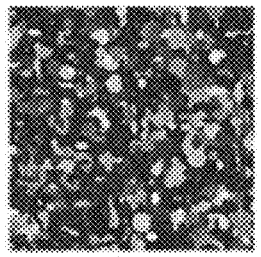
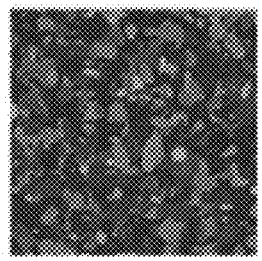
Regular (55%)  Sparse pattern (5%)  Random large speckles (30%)  Extra noises (5%)  Low contrast (5%)
Fig. 6

Definition and range of displacement parameters.

| Deformation parameter | Range | Effective max. displacement (w.r.t the final image size 128×128) |
|---|---|---|
| Translation | | |
| $t_x, t_y$ | −4.0 ~ 4.0 pixel | 2.0 pixel |
| Stretch | | |
| $k_x, k_y$ | 0.96 to 1.04 | 5.1 pixel |
| Rotation | | |
| $\theta$ | −0.01 to 0.01 rad | 2.4 pixel |
| Shear | | |
| $\gamma_x, \gamma_y$ | −0.03 to 0.03 | 3.8 pixel |
| Gaussian functions | | |
| $A_x, A_y$ | 0.003 ~ 0.6 | 4.6 pixel |
| $\sigma_{xa}, \sigma_{ya}, \sigma_{xb}, \sigma_{yb}$ | 0.06 ~ 0.5 | |
| $x_a, y_a, x_b, y_b$ | 0 ~ 511 | |

Fig. 7

| Prediction error | DisplacementNet (pixel) | | StrainNet (%) | |
|---|---|---|---|---|
| Validation set | Max: 0.047 | Average: 0.024 | Max: 0.064 | Average: 0.031 |
| Test set | Max: 0.083 | Average: 0.038 | Max: 0.085 | Average: 0.041 |

*Strain error is represented as the absolute value in terms of percent strain, not a relative percentage error.

Fig. 10

Performance comparison between Deep DIC and VIC-2D on two examples in the test set.

| | Average displacement error | | Average strain error | | |
|---|---|---|---|---|---|
| | $u$ | $v$ | $\epsilon_{xx}$ | $\epsilon_{yy}$ | $\epsilon_{xy}$ |
| Test #1 | | | | | |
| Deep DIC | 0.0079 pixel | 0.0052 pixel | 0.020% | 0.019% | 0.040% |
| VIC-2D | 0.0342 pixel | 0.0373 pixel | 0.064% | 0.271% | 0.075% |
| Test #2 | | | | | |
| Deep DIC | 0.0097 pixel | 0.0081 pixel | 0.035% | 0.015% | 0.037% |
| VIC-2D | 0.067 pixel | 0.0448 pixel | 0.112% | 0.064% | 0.069% |

Fig. 12

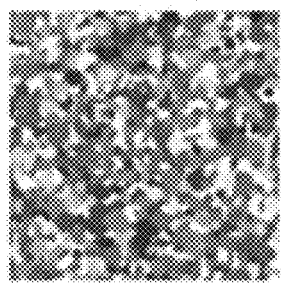
Reference image
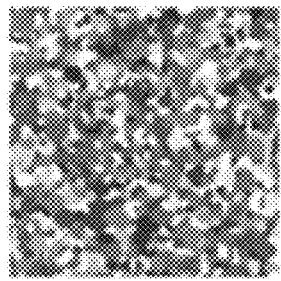
Deformed image
Fig. 13C

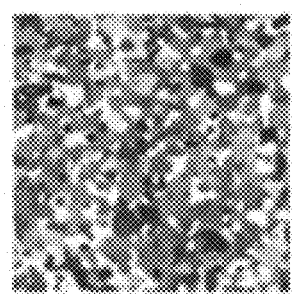
Reference image
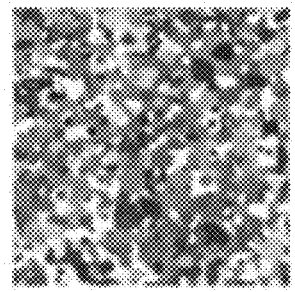
Deformed image
Fig. 14C

Comparison of noise floor level measurement between Deep DIC and VIC-2D.

|  |  | Mean value | Standard deviation |
|---|---|---|---|
| Displacement | DisplacementNet | 0.0094 pixel | 0.0065 pixel |
|  | VIC-2D | 0.0118 pixel | 0.0134 pixel |
| Strain | StrainNet | 0.0073% | 0.0045% |
|  | VIC-2D | 0.0052% | 0.0066% |

Fig. 16

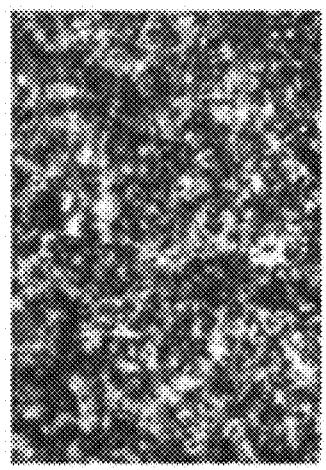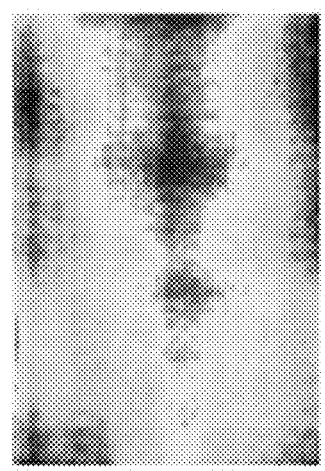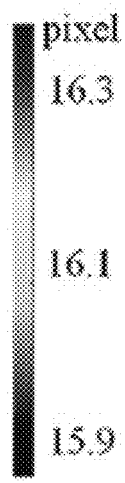
Image sample  Final displacement field
Fig. 17A

IMAGE CORRELATION FOR END-TO-END DISPLACEMENT AND STRAIN MEASUREMENT

CROSS-REFERENCE TO RELATED APPLICATION

The present application claims the priority benefit of U.S. Provisional Patent App. No. 63/248,896 filed on Sep. 27, 2021, the entire disclosure of which is incorporated by reference herein.

BACKGROUND

Digital image correlation (DIC) is a powerful and flexible optical technique that extracts full-field shape, motion, and deformation information through image analysis. It has been widely applied in experimental solid mechanics to accurately measure two-dimensional (2D) and three-dimensional (3D) displacement and strain fields in material testing of diverse material systems, including engineering metals, polymers, bio-materials, and even 3D structures. Digital image correlation also becomes a powerful measurement technique in dynamic material testing, such as material fatigue behavior monitoring and crack tip growth measurement. The common practice of DIC includes pre-painting of a sample with artificial speckle patterns, image capture of sample deformation during material testing, and calculation of full-field displacement and strain fields with a correlation-based algorithm. For the calculation of a displacement field, the reference and deformed images are divided into subsets of the same size. A correlation criterion between all subsets in the reference and deformed images is established to evaluate their similarity. After matching the reference and deformed subsets, a displacement mapping function (also called a shape function) uses a sub-pixel registration algorithm to interpolate the matching subsets to sub-pixel displacements. The strain field is calculated by taking the spatial derivatives of the obtained displacement field. Compared with pointwise strain gauge measurement, DIC is capable of performing a full-field measurement without the need for direct contact with samples, which improves the robustness and accuracy of the measurement. Vison-based DIC also offers an easy to setup solution, which does not require strict experimental conditions, such as a coherent light source and vibration isolation environment, which are often required by interferometric techniques.

SUMMARY

An illustrative system for correlating image data includes a memory configured to store a sequence of images of a sample. The system also includes a processor operatively coupled to the memory and configured to crop a first pair of images to specify a region of interest in the first pair of images, where at least one image in the pair of images is from the sequence of images. The processor is also configured to calculate, using a first convolutional neural network, a displacement field for the first pair of images. The processor is also configured to calculate, using a second convolutional neural network, a strain field for the first pair of images. The processor is further configured to determine an amount of displacement or deformation of the sample based at least in part on the displacement field and the strain field.

In an illustrative embodiment, the strain field is calculated independent of the displacement field. In one embodiment, the first pair of images include a reference image and a deformed image, where the deformed image is a deformed version of the reference image. In another embodiment, the processor generates the deformed image by warping the reference image. In another embodiment, the processor is configured to determine an updated region of interest based at least in part on the calculated displacement field. The processor is configured to determine the updated region of interest based on updated coordinates of four corner points in the displacement field such that the updated region of interest tracks a deformation of the sample.

In another embodiment, the processor is configured to crop a second pair of images using the updated region of interest. The processor can be further configured to calculate, using the first convolutional neural network, an updated displacement field for the second pair of images. The processor can also determine a subsequent updated region of interest based at least in part on the updated displacement field for the second pair of images, and crop a third pair of images using the subsequent updated region of interest.

In one embodiment, the system is trained with one or more synthetic datasets. In another embodiment, the processor is configured to use the displacement field to generate two image outputs, where each of the two image outputs has a size of h w. The processor can also be configured to use the strain field to generate three image outputs, where each of the three image outputs has a size of h×w, and where each of the three matrix outputs includes a plane strain component.

An illustrative method for correlating image data includes storing, in a memory of a computing system, a sequence of images of a sample. The method also includes cropping, by a processor operatively coupled to the processor, a first pair of images to specify a region of interest in the first pair of images, where at least one image in the pair of images is from the sequence of images. The method also includes calculating, by the processor and using a first convolutional neural network, a displacement field for the first pair of images. The method also includes calculating, by the processor and using a second convolutional neural network, a strain field for the first pair of images. The method further includes determining, by the processor, an amount of displacement or deformation of the sample based at least in part on the displacement field and the strain field.

In an illustrative embodiment, calculating the strain field includes calculating the strain field independent of the displacement field. In another embodiment, the first pair of images include a reference image and a deformed image, and the method further includes forming the deformed image by warping the reference image. The method can also include determining, by the processor, an updated region of interest based at least in part on the calculated displacement field. In some embodiments, the processor is configured to determine the updated region of interest based on updated coordinates of four corner points in the displacement field such that the updated region of interest tracks a deformation of the sample.

The method can also include cropping, by the processor, a second pair of images using the updated region of interest. The method can further include calculating, by the processor and using the first convolutional neural network, an updated displacement field for the second pair of images. The message can also include determining, by the processor, a subsequent updated region of interest based at least in part on the updated displacement field for the second pair of images. The method can further include cropping, by the processor, a third pair of images using the subsequent updated region of interest. In some embodiments, the method includes training the system with one or more synthetic datasets. In another embodiment, the method includes generating, by the processor using the displacement field, two image outputs, where each of the two image outputs has a size of h w. The method can also include generating, by the processor using the strain field, three image outputs, where each of the three image outputs has a size of h×w, and wherein each of the three matrix outputs includes a plane strain component.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 5 is a table that includes a detailed speckle pattern generation algorithm and parameter range in accordance with an illustrative embodiment.

FIG. 6 depicts examples of different pattern qualities in accordance with an illustrative embodiment.

FIG. 7 is a table that depicts the range of rigid body translation ($t_x$, $t_y$), rotation ($\theta$), stretch/compression ($k_x$, $k_y$), and shear ($y_x$, $y_y$) in accordance with an illustrative embodiment.

FIG. 10 is a table that summarizes mean maximum prediction errors and the average errors on the validation set in accordance with an illustrative embodiment.

FIG. 12 is a table that summarizes the results of the performance comparison between the proposed system and VIC-2D on two examples from the test set in accordance with an illustrative embodiment.

FIG. 13C depicts the image input pair the was the basis for the comparisons made in FIGS. 13A-13B in accordance with an illustrative embodiment.

FIG. 14C depicts the image input pair the was the basis for the comparisons made in FIGS. 14A-14B in accordance with an illustrative embodiment.

FIG. 16 is a table that summarizes the statistical analysis of all 21 measurements for the noise floor level comparison in accordance with an illustrative embodiment.

FIG. 17A is a plot of predicted final displacement field when validating the system for simple rigid body translational motion in accordance with an illustrative embodiment.

DETAILED DESCRIPTION

Figure 1:
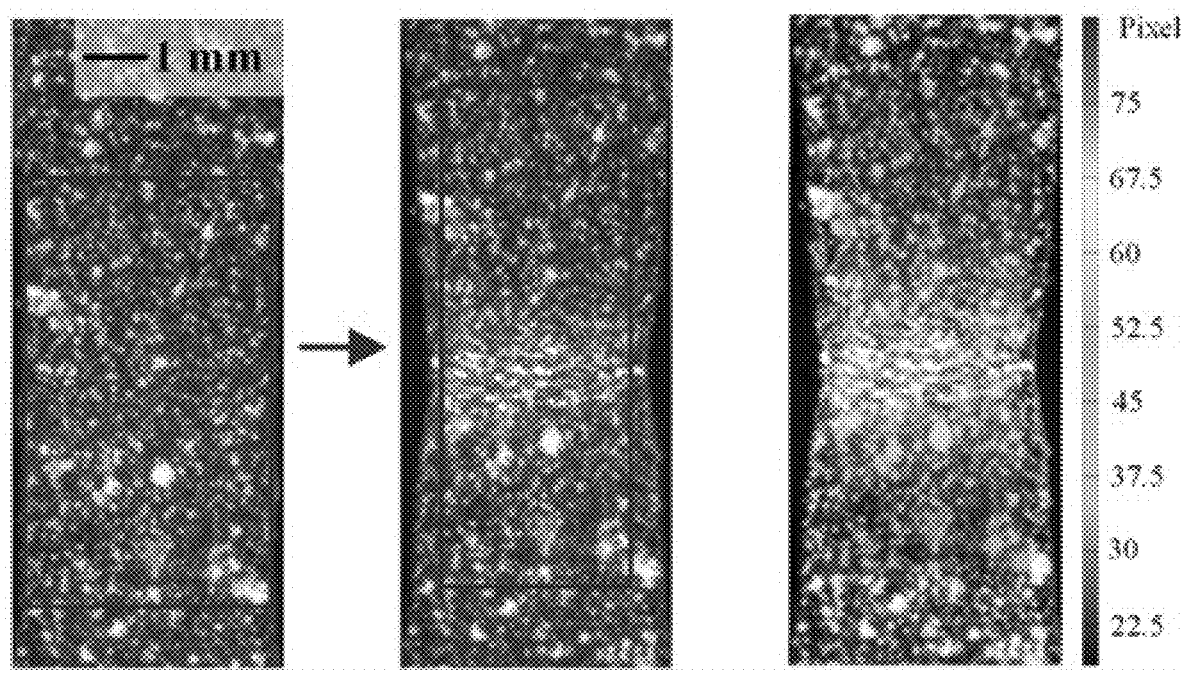
FIG. 1A depicts how speckle patterns start to tear under large deformation in accordance with an illustrative embodiment.
FIG. 1B depicts how commercial DIC software fails to output a displacement prediction in a severely distorted region of the speckle pattern in accordance with an illustrative embodiment.

Since its first introduction in the 1980s, digital image correlation (DIC) algorithms have been rapidly developed and improved to achieve higher accuracy with better computational efficiency. For example, two fundamental criteria of correlation in DIC, sum-squared difference (SSD) and cross-correlation (CC), were proposed in the 1980s. Since then, different definitions of correlation criteria have been developed based on the above two fundamental criteria, such as zero-normalized cross-correlation (ZNCC) and parametric sum of squared difference (PSSD). Besides the correlation criterion, displacement field calculation is another essential step. After finding the image similarity by searching the maximum CC coefficient or the minimum SSD coefficient, a variety of registration algorithms have been developed to derive sub-pixel displacement distributions. Most algorithms can be cast into two categories, the local subset-based and global (continuum) methods. Local subset-based methods are realized by interpolation using gray-scale pixel values or a correlation matrix within each subset. Other subset-based methods are achieved by iterative calculations that solve non-linear mapping parametric vectors and spatial gradients, or directly finding the local maximum of statistical similarity function. Since the subset-based methods solve the displacement field within each subset, the calculation can be implemented in parallel to accelerate the overall calculation speed. However, the continuity between different subsets cannot be guaranteed, causing a noisy strain field output. On the other hand, in global (continuum) methods, the displacement field of the whole image is represented by a set of shape functions and solved with finite element methods. The global (continuum) methods ensure that the whole displacement field is compatible to capture locally heterogeneous deformation, but the overall prediction precision and computational efficiency are inferior to subset-based methods.

As deep learning has received great success in multiple computer vision tasks such as image classification, object detection, and 3D reconstruction, it has also been used in optical flow estimation, which is a computer vision task that also aims to extract a displacement field from image pairs. Convolutional neural network (CNN)-based methods have surpassed the traditional optical flow techniques in terms of accuracy and computation speed. By stacking multiple convolutional and deconvolutional layers with proper pooling and activation functions, CNN owns a superb ability to recover optical flow fields with sub-pixel accuracy between image pairs, even for large displacement. By looking into the principle of CNNs, one can find some similarities between CNN and DIC algorithms. The subset correlation calculation in DIC and the convolution operation in CNN are all kernel-based. The peak searching in DIC works similarly to the max-pooling layer in CNN. The difference observed between DIC and CNN is that the correlation criterion in DIC is a highly nonlinear function; while in CNN, feature maps are extracted with a linear calculation of kernel values followed by an activation function. By stacking multiple layers, CNN-based methods are able to recover a highly non-linear relationship between the input and output, potentially outperforming traditional DIC algorithms.

There have been several recent attempts to bring deep learning to DIC. For example, a 3D convolutional neural network was developed to extract both the spatial and temporal domain features from a sequence of image sets and output an average displacement vector for each image subset. The training dataset was augmented from a small set of experimental results, which limited their model performance. The strain field prediction was not achieved, while the displacement field prediction did not outperform traditional DIC. Another research group took the inspiration of deep learning in optical flow and applied it to DIC. They trained multiple CNNs modified from existing optical flow CNNs with synthesized speckle image datasets to achieve high prediction accuracy for sub-pixel deformation or motion. Since their approach targeted sub-pixel displacements, the final displacement field was obtained by first applying a traditional correlation method to retrieve integer shifts followed by a CNN prediction to extract sub-pixel deformation. The approach demonstrated some promising results with high accuracy, but it essentially worked as a hybrid method that still involved subset division, post-filtering, and traditional correlation methods.

Though bringing deep learning to DIC for material characterization seems an attractive and promising idea, there has not been any real success in doing so. There are three main challenges that prevent deep learning from being successfully applied in DIC for deformation measurement. First, no full-field strain field prediction has been reliably demonstrated using deep learning in previous works. The pixel-level prediction enabled by CNNs will inevitably introduce high spatial-frequency noises that will be magnified by the derivative operations in the calculation of the strain field. A Gaussian filter is often applied to smooth the displacement field for strain calculation, but it would defeat the advantage of CNN-based approaches that can potentially capture high spatial-frequency deformation. Second, previous deep learning-based methods did not show a significant performance advantage over traditional DIC except for computational efficiency. It is suspected that the reason is partially due to the bad quality of training datasets. One research group generated a training set by augmenting a small set of experimental results with too few variances, which affected the model's transferability and robustness. The ground truth was obtained using traditional DIC, which set its performance limit. In other words, the proposed neural network was designed not to surpass traditional DIC. Another group applied random displacements at predefined mesh grids and linearly interpolated the displacements inside each cell. In their case, the displacement field was piecewise continuous but not physically informed. The training set would not resemble a typical loading case in actual mechanical tests. Third, there has not been any rigorous attempt to directly compare the prediction accuracy of both displacement and strain fields for deep learning-based and traditional DIC.

In addition to the challenges mentioned above, the motivation to bring deep learning to DIC has not been very clear in previous studies. DIC is a well-established method with commercially available and industry-trusted software packages, and the inventors explored the potential benefits to use deep learning in DIC. In daily material testing, some deficiencies in traditional DIC were identified. For example, when performing a tensile test on soft materials, the magnitude of strain can be well above 100%, where the commercial DIC software will fail to give strain prediction when the speckle patterns start to tear or break, as shown in FIG. 1. Specifically, FIG. 1A depicts how speckle patterns start to tear under large deformation in accordance with an illustrative embodiment. FIG. 1B depicts how commercial DIC software fails to output a displacement prediction in a severely distorted region of the speckle pattern in accordance with an illustrative embodiment. The correlation algorithm is based on pattern matching, which requires the complete integrity of speckle patterns. With the increasing popularity of ultra-stretchable materials, it is imperative to develop new techniques to be able to give robust predictions of full-field strain even when the quality of speckle patterns starts to deteriorate at large deformation. In addition, the computational cost of traditional DIC is still relatively high and significantly affected by the pattern quality.

Motivated by this identified need in the material testing tasks to measure full-field large strain distributions, the inventors developed a new and end-to-end deep learning-based DIC approach (Deep DIC), that directly solves the displacement and strain fields from image pairs with no interpolation or iteration. The goal is to achieve robust and accurate predictions of both full-field and high-resolution displacement and strain fields using an end-to-end approach from a sequence of speckle patterns, particularly in tensile testing applications. Furthermore, as inspired by CNN-based optical flow methods, the proposed system leverages the ability of CNNs to map highly nonlinear relationships between input and output to overcome the difficulties in estimating large strains with deteriorated speckle patterns. Specifically, the proposed system can be directly compared with commercial DIC software to (1) give a more robust strain prediction at large deformation; (2) achieve a similar or better prediction accuracy for small and moderate deformation; and (3) reduce computing time for potential real-time measurement and prediction.

Facing the same challenges when bringing deep learning to DIC as analyzed above, the inventors developed two major innovations to address these challenges. First, rather than calculate the strain fields from the spatial derivatives of the displacement field as traditional DIC does, the proposed system will directly output the strain field from the image input in an end-to-end approach. Two separate CNNs will be designed based on a modified encoder-decoder structure, and can be referred to as DisplacementNet and StrainNet. Two CNNs work independently to give displacement and strain field predictions, as well as collaboratively to adaptively update the region of interest (ROI) for tracking large deformation. Second, the inventors designed a new method to synthesize realistic and comprehensive datasets for training the model. By rendering speckle patterns with different qualities, as well as prescribing a wide variety of random rigid body motion and deformation, the robustness and adaptability of Deep DIC can be increased. Though only trained on synthesized datasets (which could be a potential benefit with a very low training cost), the proposed system is able to outperform traditional DIC on real experimental data. In addition to these two innovations, the inventors also systematically evaluated the performance of the proposed system and compared it with commercial DIC software to validate its real-life performance.

Figure 2:
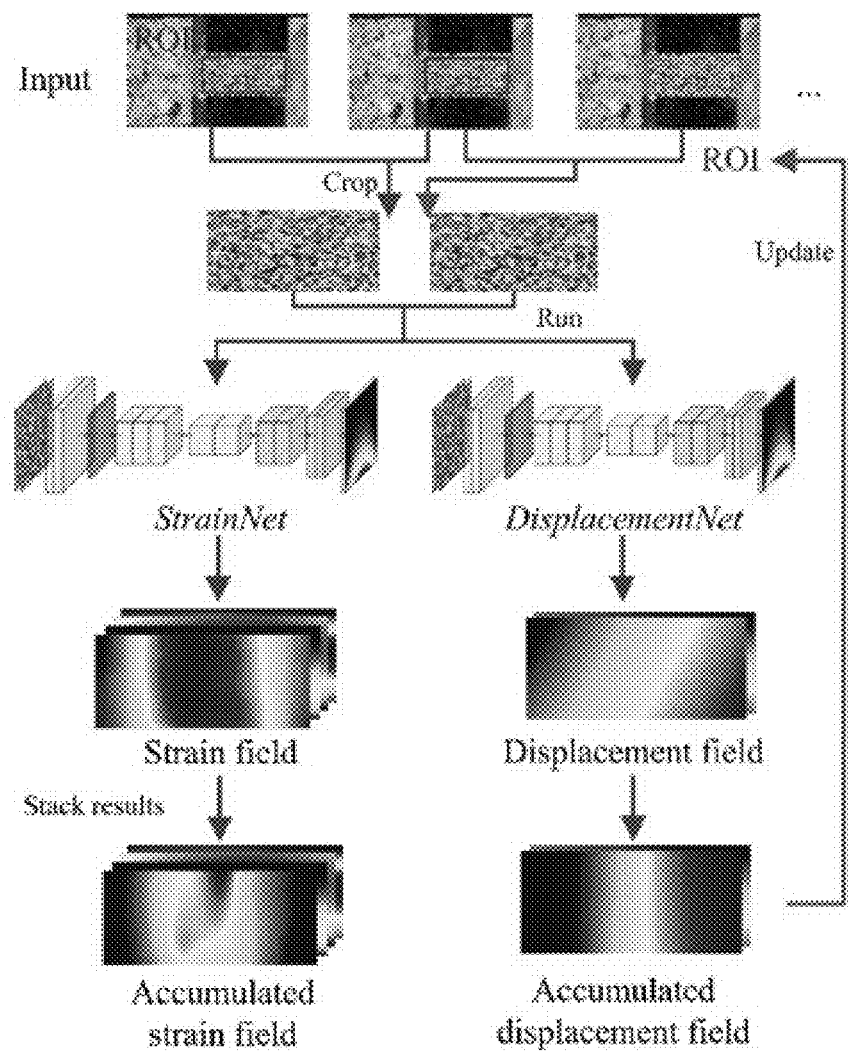
FIG. 2 depicts a workflow of the proposed Deep DIC system for tensile testing in accordance with an illustrative embodiment.

FIG. 2 depicts a workflow of the proposed Deep DIC system for tensile testing in accordance with an illustrative embodiment. A region of interest (ROI) is initially defined in the starting frame of a sequence of image inputs. Two individual CNNs, DisplacementNet and StrainNet, are designed to separately calculate the displacement and strain fields in the ROI extracted from the image inputs. The accumulated displacement and strain fields are updated based on the latest incremental calculations. The definition of ROI is then updated based on the updated coordinates of four corner points in the accumulated displacement field, so the ROI is adaptively changed to track a large deformation. The procedure is repeated to analyze the next pair of image inputs with an updated ROI until the last frame in the sequence. The two CNNs provide independent predictions of displacement and strain fields in an end-to-end manner directly from raw image inputs.

Figure 3:
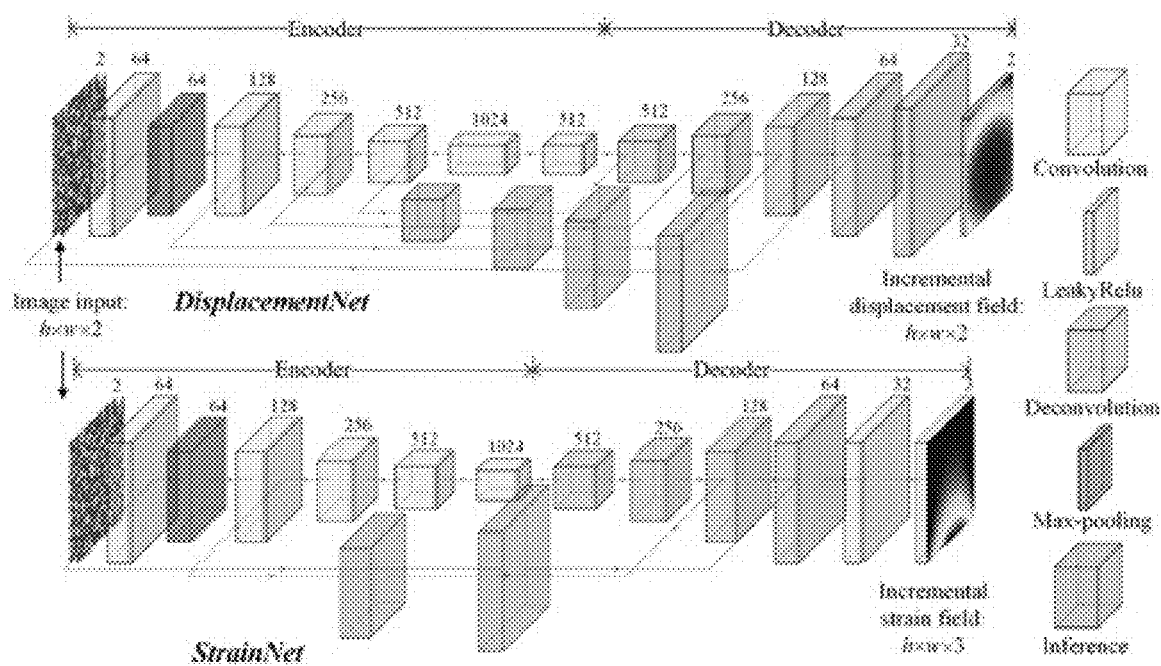
FIG. 3 depicts schematics of the architectures a displacement field CNN and a strain field CNN in accordance with an illustrative embodiment.

Described below are the designs of DisplacementNet and StrainNet, the methodology to generate synthetic training datasets and corresponding ground truths, as well as training details. As discussed, two separate convolutional neural networks are used to independently learn the displacement and strain fields from the same input of an image pair. FIG. 3 depicts schematics of the architectures a displacement field CNN and a strain field CNN in accordance with an illustrative embodiment. In FIG. 3, the numbers above each module indicate the feature map depth. The input to both models is a pair of speckle images with a height h and width w. Due to the adaptive tracking of the ROI, the input image size is not fixed. Pre-processing is utilized to scale the image to the nearest multiples of 32 in both length and width, so that the exact size matching can be guaranteed for the inference concatenation. Alternatively, a different multiple may be used, such as 16, 64, etc. The results are then scaled back to get the actual displacement field. The strain field prediction is not affected by the rescaling. The final outputs from DisplacementNet are two images of size h×w, giving the predicted displacement components, u and v. The outputs from StrainNet are three images of size h×w, giving the three plane strain components, $\varepsilon_{xx}$, $\varepsilon_{yy}$, and $\varepsilon_{xy}$. In the training dataset, all the inputs were formatted to the size of 128×128, as described in more detail below.

Both DisplacementNet and StrainNet follow a modified encoder-decoder structure, which has been widely adopted in image segmentation tasks that require high-resolution output. In the encoder part, a chain of convolution operations with a kernel size of 3 and a stride size of 2 sequentially condenses the size of the feature map while doubling its depth with each convolutional layer. This allows the CNNs to extract deep features from the sparse information in the input image pair. In the decoder part, a chain of deconvolution operations reverses the encoder operations to double the feature map size and halve the map depth with each deconvolutional layer. The function of the deconvolutional layer is to recover the high-resolution displacement/strain field from high-dimensional feature maps. Since the absolute values for strain and displacement are numerically small, the gradient of the loss function with respect to the CNN parameters could vanish as the network goes deep. Therefore, in order to accelerate training, for each convolutional (deconvolutional) layer, a batch normalization operation is used before the activation function. In both CNNs, following each batch normalization operation, the activation function LeakyReLU was adopted with a slope of 0.01 for negative values. In alternative embodiments, a different activation function may be used.

The encoder-decoder structure was modified by adding multiple inference layers to concatenate early-stage feature maps in the encoder stage to features maps in the decoder stage. This operation is intended to prevent the loss of details in the chain convolution operations. It was found that the inclusion of inference layers improves the training speed and prediction accuracy. It is noted that DisplacementNet and StrainNet have slightly different structures in terms of the depth and number of inference layers, which have been manually adjusted to achieve the best learning results.

Figure 4:
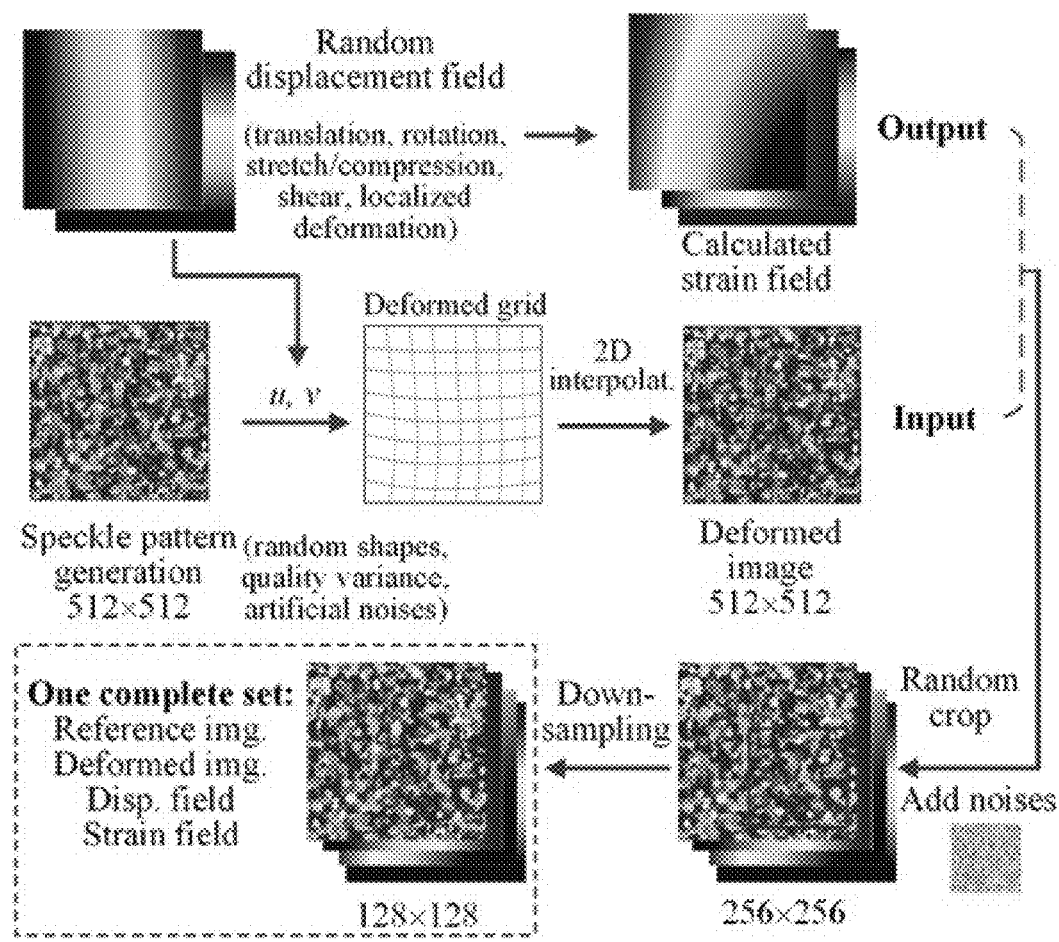
FIG. 4 depicts the overall approach for dataset generation in accordance with an illustrative embodiment.

With respect to dataset generation, in one embodiment, the proposed system can be trained completely on synthetic datasets. This allows significant cost savings and provides better control over data quality. Described below is a method to generate a realistic and high-quality dataset with both reference and deformed images as well as the corresponding ground truths of displacement and strain fields. FIG. 4 depicts the overall approach for dataset generation in accordance with an illustrative embodiment. Initially, artificially generated speckle pattern images are created with different qualities in order to increase the robustness of trained models to deal with real-life situations. A variety of random motion and deformation is analytically defined to generate a displacement field as the ground truth for DisplacementNet. Based on the defined displacement field, the original speckle pattern image is warped to get the deformed image. The ground truth for the strain field can be analytically calculated by taking the spatial derivatives of the displacement field. Additional post-processing, such as random crop, down-sampling, and adding artificial noises, etc., is performed to get a complete set of one data sample, which includes the inputs to the proposed system in the form of the reference and deformed images, and the outputs in the form of the predefined displacement field and calculated strain field. The implementation details are described step by step below.

Speckle pattern images are generated by stacking ellipses with random sizes and gray-scale values. Each speckle pattern image contains 2,800 to 4,500 ellipses within a frame size of 512×512. For each sample in the dataset, a unique and random speckle pattern is created, so there is no re-utilization of speckle images. To increase the robustness and adaptivity of the proposed system, speckle patterns with quality variances were deliberately included, including images with sparse speckle distribution (5% of the total samples), random large speckles (30%), extra noises (5%), and low contrast (5%). FIG. 5 is a table that includes a detailed speckle pattern generation algorithm and parameter range in accordance with an illustrative embodiment. FIG. 6 depicts examples of different pattern qualities in accordance with an illustrative embodiment.

Regarding displacement field and strain field generation, a 2D displacement field is defined for each sample image by combining random rigid body translation, rotation, stretch/compression, shear, and localized deformation formulated with 2D Gaussian functions. The mathematical definition of a randomly generalized displacement field is given in Equation (1) below, while the localized deformation is described by 2D Gaussian functions in Equation (2):

$$\begin{bmatrix} u \\ v \end{bmatrix} = \underbrace{\begin{bmatrix} \cos\theta & \sin\theta \\ -\sin\theta & \cos\theta \end{bmatrix}}_{\text{Rigid body rotation}} \cdot \left( \underbrace{\begin{bmatrix} k_x - 1 & \gamma_x \\ \gamma_y & k_y - 1 \end{bmatrix}}_{\text{Uniform stretch and shear}} \cdot \begin{bmatrix} x \\ y \end{bmatrix} + \underbrace{\begin{bmatrix} u_x^g \\ u_y^g \end{bmatrix}}_{\text{2D Gaussian deformation}} \right) + \underbrace{\begin{bmatrix} t_x \\ t_y \end{bmatrix}}_{\text{Rigid body translation}} \quad \text{Equation 1}$$

$$\begin{bmatrix} u_x^g \\ u_y^g \end{bmatrix} = \sum_{j=1}^{N} \begin{bmatrix} A_x^j e^{-\frac{1}{2}\left(\frac{x-x_0^j}{\sigma_{x_0}^j}\right)^2 - \frac{1}{2}\left(\frac{y-y_0^j}{\sigma_{y_0}^j}\right)^2} \\ A_y^j e^{-\frac{1}{2}\left(\frac{y-y_1^j}{\sigma_{y_1}^j}\right)^2 - \frac{1}{2}\left(\frac{x-x_1^j}{\sigma_{x_1}^j}\right)^2} \end{bmatrix}, N = 1 \text{ or } 2 \quad \text{Equation 2}$$

In the equations, {u, v} are the displacement components in the x and y directions. The values {x, y} are the original coordinates of each pixel in the reference image. FIG. 7 is a table that depicts the range of rigid body translation ($t_x$, $t_y$), rotation (θ), stretch/compression ($k_x$, $k_y$), and shear ($y_x$, $y_y$) in accordance with an illustrative embodiment. The rotation center is assumed to be at the coordinate origin. The raw image (512×512) is later randomly cropped to a size of 256×256 to effectively shift the rotation center to a random position in the image. Two 2D Gaussian functions, given in Equation (2), define two localized deformations with ran-domized amplitudes ($A_x$, $A_y$), centers of the peak ($x_0$, $y_0$, $x_1$, $y_1$), and standard deviations ($\sigma_{x0}$, $\sigma_{y0}$, $\sigma_{x1}$, $\sigma_{y1}$). Up to two Gaussian function-defined displacement fields can be superimposed to the final displacement field. The range of Gaussian function parameters is also given in the table of FIG. 7. Since the defined image is later randomly cropped from 512×512 to 256×256, the centers of the peak in the Gaussian functions can be effectively outside of the image frame to add more deformation variances and to remove hidden trends in the dataset.

The generated 2D displacement field is adopted as the ground truth for training DisplacementNet. The corresponding strain field can be analytically calculated by taking the spatial derivatives of the displacement field based on the infinitesimal strain assumption, which is defined in Equation (3) below. The calculated strain field is used as the ground truth for training StrainNet. Since the random displacement fields are defined by Gaussian functions, which are smooth or indefinitely differentiable, the compatibility of corresponding strain fields is always satisfied.

$$\varepsilon_{xx} = k_x + \frac{\partial u_x^g}{\partial x} \quad \text{Equation 3}$$

$$\varepsilon_{yy} = k_y + \frac{\partial u_y^g}{\partial y}$$

$$\varepsilon_{xy} = \frac{1}{2}\left(\gamma_x + \gamma_y + \frac{\partial u_x^g}{\partial y} + \frac{\partial u_y^g}{\partial x}\right)$$

Figure 8:
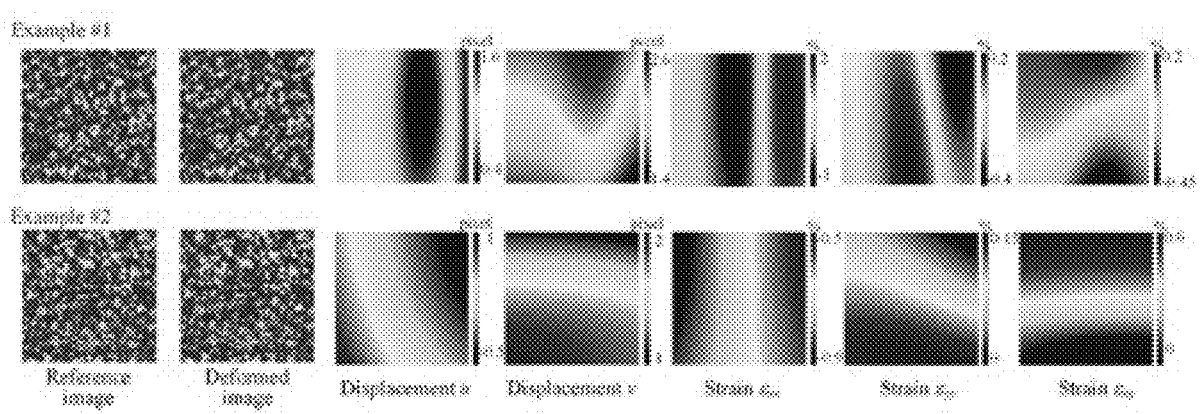
FIG. 8 depicts two examples of generated displacement and strain fields, along with the reference and deformed speckle images, in accordance with an illustrative embodiment.

Image deformation is described below. The deformed image is synthesized by first applying the predefined displacements to each pixel to get the deformed grid coordinates and then interpolating the randomly scattered grids back to a uniform grid using, for example, MATLAB in-built function griddata. The reference and warped images were randomly cropped from 512×512 to a size of 256×256 to remove hidden patterns in the dataset. Additional Gaussian noises with an intensity of 0.001 and a mean value of 0 are applied separately to the reference and warped images to mimic the image capture noises. The images are further downsampled to 128×128 to blur the sharp edges. FIG. 8 depicts two examples of generated displacement and strain fields, along with the reference and deformed speckle images, in accordance with an illustrative embodiment. The statistical analysis of the dataset is described in more detail below.

Figure 9A:
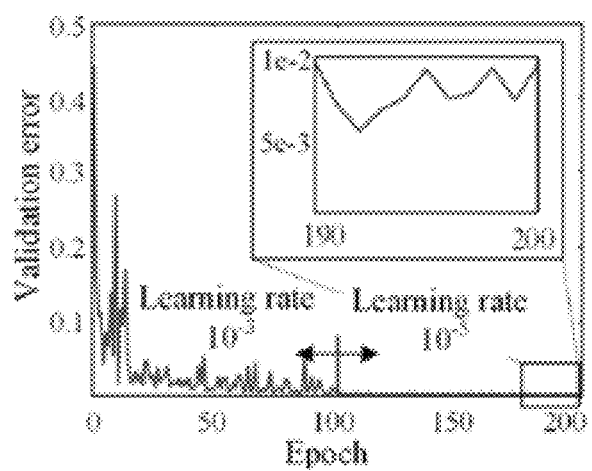
FIG. 9A depicts a plot of the convergence history for the displacement CNN (DisplacmentNet) in accordance with an illustrative embodiment.
Figure 9B:
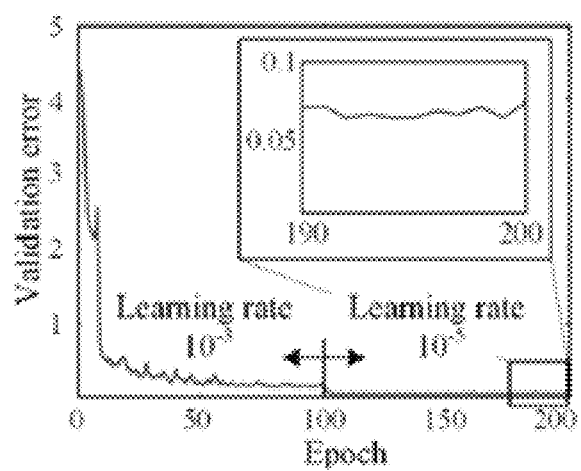
FIG. 9B depicts a plot of the convergence history for the strain CNN (StrainNet) in accordance with an illustrative embodiment.

DisplacementNet and StrainNet can both be implemented on the PyTorch (version 1.6.0) platform, or any other platform known in the art. The package Torchvision (version 0.7.0) can be used to build the CNN structure and Pillow (7.2.0) can be used to load, crop and resize the images. Alternatively, different platforms/software may be used. The loss function for DisplacementNet is the mean square error (MSE) between the predicted and predefined displacement fields multiplied by 10. The loss function for StrainNet is the MSE between the predicted and ground truth strain fields multiplied by 100 to compensate for the scale of strain values. Adam was selected as the optimization method since it can adaptively change the learning rate according to the current gradient, resulting in a faster convergence rate. The two momentum parameters for Adam are set to $\beta_1$=0.9 and $\beta_2$=0.999. For DisplacementNet, the learning rate is initiated with 0.001 and further reduced by a factor of 100 after 100 epochs. After 200 epochs of training, the error in the validation set for DisplacementNet is settled below 0.01. For StrainNet, the learning rate starts at 0.001 and is reduced to 1e-5 after 100 epochs. The training is stopped at epoch 198 for StrainNet when the validation error is settled to 0.06. FIG. 9A depicts a plot of the convergence history for the displacement CNN (DisplacmentNet) in accordance with an illustrative embodiment. FIG. 9B depicts a plot of the convergence history for the strain CNN (StrainNet) in accordance with an illustrative embodiment. FIG. 10 is a table that summarizes mean maximum prediction errors and the average errors on the validation set in accordance with an illustrative embodiment. Since strain is represented in percentage, the strain error indicated in the table of FIG. 10 (and herein generally) is the absolute value as a percent strain, not the relative percentage error.

In one embodiment, the proposed system is only trained on one or more synthetic datasets, but is designed to perform on both simulated and experimental data. Included below is a discussion on the adoption of an end-to-end approach for strain prediction, followed by a systematic evaluation of the performance of the system on both synthetic samples and experimental data. The results are directly compared with commercial DIC software, VIC-2D (v6, Correlated Solutions, Inc., USA) (Correlated Solutions, 2021) and GOM Correlate (v2020, GOM Metrology, Germany) (GOM, 2021). In addition to the comparison of predicted displacement fields, also included are the results of strain field prediction for its important application in material testing.

One major difference between the proposed system and previous attempts is the direct prediction of a strain field from a pair of image inputs, independent of displacement predictions. The inventors have noticed significant advantages of this end-to-end method over the approach to take spatial derivatives with respect to the displacement field. Even in traditional DIC, spatial filtering is commonly adopted to compute the strain field, which not only reduces the spatial resolution of the strain prediction, but also adds another knob tuning parameter in the post-processing, since there is no established guideline on the correct choice of filtering parameters.

The situation gets worse with deep learning-based approaches. The proposed system and other deep learning-based approaches perform a pixel-wise prediction. Though they can improve the spatial resolution of the prediction, the predicted displacement field is not guaranteed to be continuous. The analytical derivation of the strain field from the predicted displacement field will enlarge these high-frequency noises which are hard to remove by simple filtering. An accurate prediction of displacements may still lead to large errors and high-frequency noises in the strain prediction if directly calculated from spatial derivatives.

Figure 11:
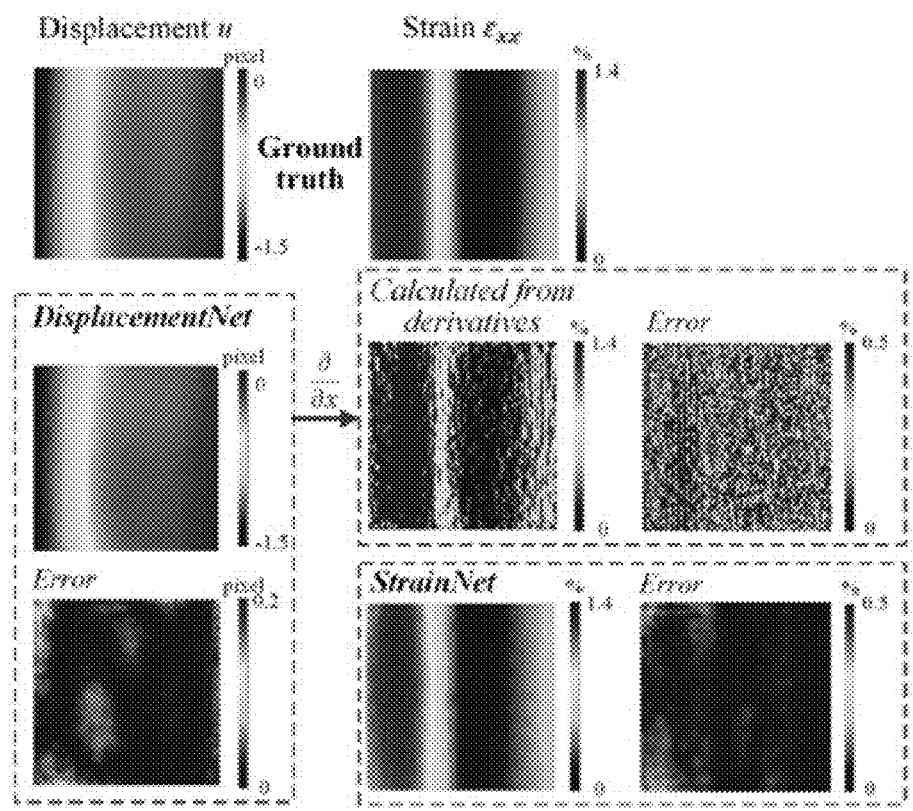
FIG. 11 depicts an example that demonstrates the maximum error in the displacement field estimation is only 0.016 pixels, while the derived strain field from taking the spatial derivatives shows high-frequency noises and large errors due to the discontinuity of the displacement field in accordance with an illustrative embodiment.

FIG. 11 depicts an example that demonstrates the maximum error in the displacement field estimation is only 0.016 pixels, while the derived strain field from taking the spatial derivatives shows high-frequency noises and large errors due to the discontinuity of the displacement field in accordance with an illustrative embodiment. The strain prediction directly from StrainNet for the same case is plotted for comparison. The color bars in the error maps are capped at 0.5% for easy visual comparison. The maximum and average prediction errors are 5.93% and 0.24% for the calculated strain field, but only 0.11% and 0.018% for the StrainNet prediction.

Besides the better strain prediction accuracy and resolution, the adoption of StrainNet also brings the additional benefits of better handling of rigid body rotation. In the calculation of strain fields for the ground truth in the dataset generation, the rigid body rotation is removed from the displacement field, as described above. The additional rigid body rotation does not affect the associated strain field in the ground truth. Since StrainNet directly predicts strains by learning from the given training dataset, it inherits the ability to remove the influence of rotational motion in the strain calculation implicitly through the deep neural networks.

However, it is noted that there are more than one strain measure, depending on applications. The StrainNet is built on an infinitesimal strain assumption given that the deformation between image frames is small. It is not able to output other types of strain measures directly. One possible workaround is to define separate StrainNets for each common strain measure, as long as the ground truth can be properly defined according to the specific strain definition.

Initially, a test set (150 samples) was used to compare the predicted results from DisplacementNet and StrainNet to the ground truth. The performance on the test set is summarized in the table of FIG. 10. The corresponding mean maximum and average displacement errors are 0.083 pixels and 0.038 pixels, while the mean maximum and average strain errors are 0.085% and 0.041%. The test set results are quite impressive and not too far from the accuracy obtained on the validation set. Two test examples corresponding to relatively small and large deformation were selected, respectively, and compared to the predicted displacement and strain fields with the ground truth and results obtained from commercial DIC software, VIC-2D. Both examples are run in VIC-2D with a subset size of 7 and a step size of 2. The average prediction errors were calculated for the two displacement components and three strain components for the proposed system. Since VIC-2D has an image output size smaller than the original image input, the inventors interpolated its results to 128×128 to match the ground truth image size by MATLAB in-built function interp2 and then compares them to the ground truth. FIG. 12 is a table that summarizes the results of the performance comparison between the proposed system and VIC-2D on two examples from the test set in accordance with an illustrative embodiment.

Figure 13A:
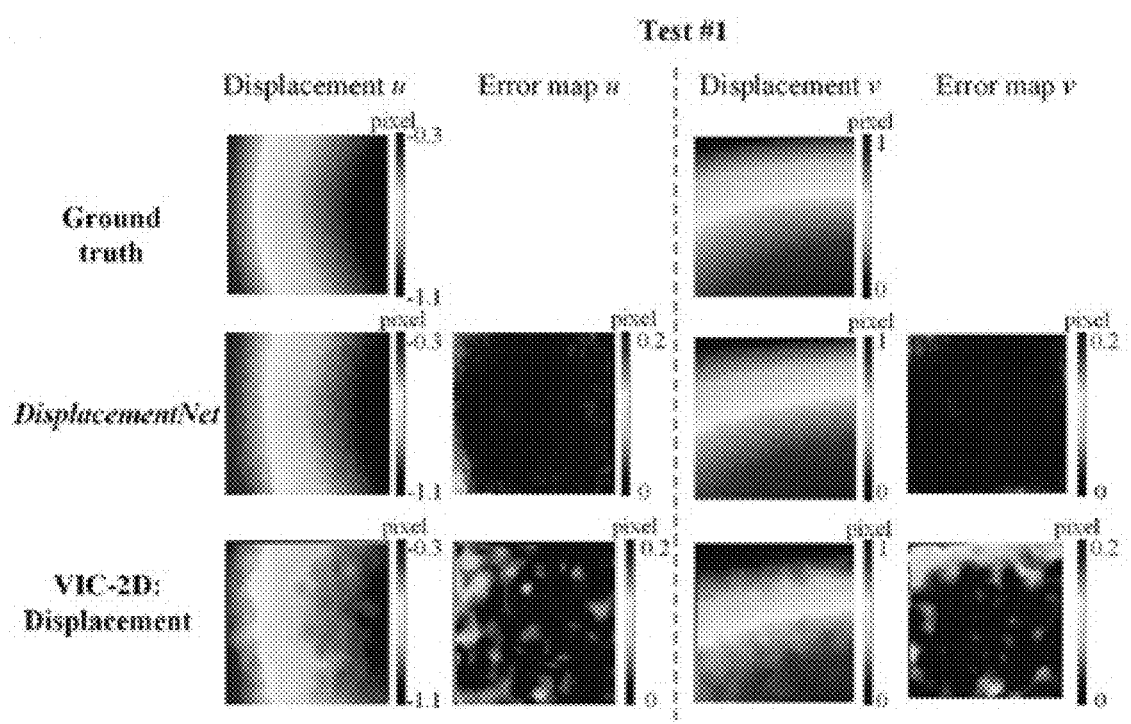
FIG. 13A depicts a displacement field comparison of a first sample in accordance with an illustrative embodiment.
Figure 13B:
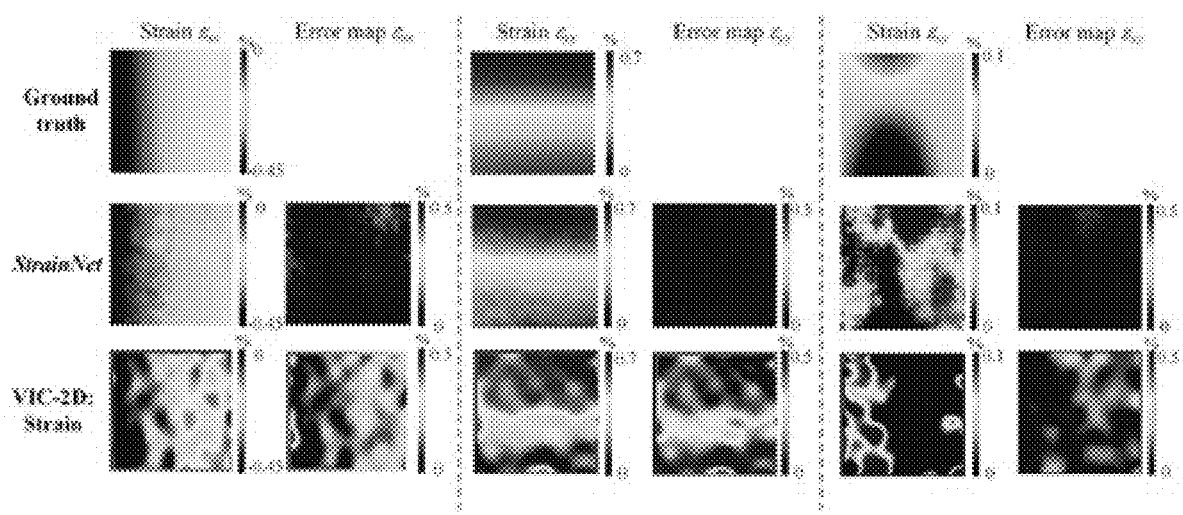
FIG. 13B depicts a strain field comparison of the first sample in accordance with an illustrative embodiment.

FIG. 13 shows the result comparison of the first test example with relatively small but complex deformation. Specifically, FIG. 13A depicts a displacement field comparison of a first sample in accordance with an illustrative embodiment. FIG. 13B depicts a strain field comparison of the first sample in accordance with an illustrative embodiment. FIG. 13C depicts the image input pair the was the basis for the comparisons made in FIGS. 13A-13B in accordance with an illustrative embodiment. The proposed system outputs more accurate predictions for all the displacement and strain components. The average prediction errors from VIC-2D are 2-7 folds of those from the proposed Deep DIC system. The strain prediction errors from VIC-2D are often of the same magnitude or even larger than the predicted strains. Particularly, the strain component C shows more than a 10-fold difference in terms of average prediction error between the two methods. The prediction accuracy drops for the complex shear strain component $\varepsilon_{xy}$ for both methods, but the proposed system still performs much better to capture the strain pattern.

Figure 14A:
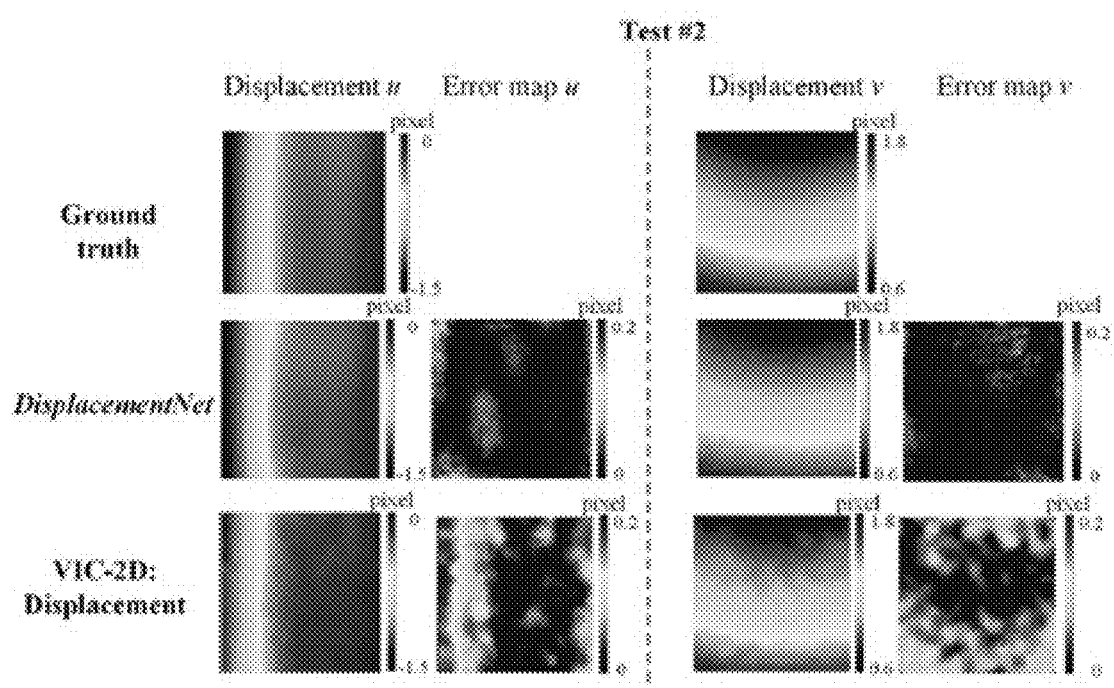
FIG. 14A depicts a displacement field comparison of a second sample in accordance with an illustrative embodiment.
Figure 14B:
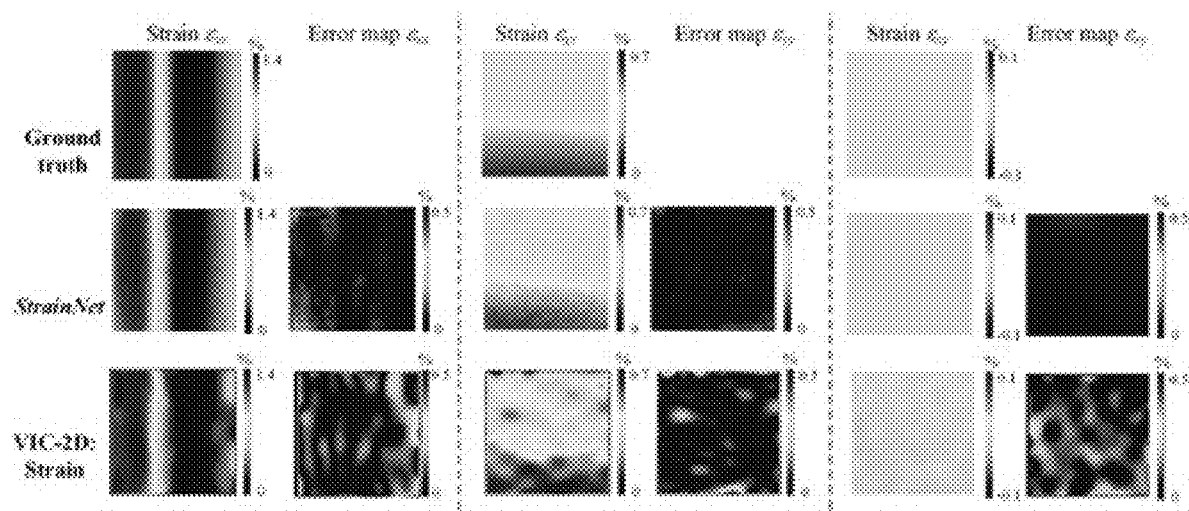
FIG. 14B depicts a strain field comparison of the second sample in accordance with an illustrative embodiment.

FIG. 14 shows the comparison of a second test example with relatively large and simple deformation. Specifically, FIG. 14A depicts a displacement field comparison of a second sample in accordance with an illustrative embodiment. FIG. 14B depicts a strain field comparison of the second sample in accordance with an illustrative embodiment. FIG. 14C depicts the image input pair the was the basis for the comparisons made in FIGS. 14A-14B in accordance with an illustrative embodiment. In this case, the shear strain is almost zero, while the sample undergoes non-uniform bilateral stretching. The accuracy comparison indicates a similar conclusion that the proposed system performs much better on the test samples compared with the commercial DIC software.

The major reason for the poor performance of VIC-2D on these two test examples is due to the additional artificial white noises added to the image inputs. Good performance of the proposed system on the test set is expected, since the test data are generated following the same algorithms to generate the training and validation sets (though with different random values). The addition of white noises is well handled by the proposed system, since the CNNs implicitly learn the denoising operation in the deep neural networks.

The proposed system was also experimentally validated. The proposed Deep DIC system uses an end-to-end learning approach, so there is no physically informed knowledge embedded in the system. The only control one has is over how to design a realistic and comprehensive dataset, so the model can learn to perform the correlation, interpolation, and derivative operations to extract accurate displacement and strain fields. The complexity of the displacement and strain fields may or may not affect the prediction accuracy. In other words, deep learning-based DIC may perform well on a particularly complex case, but perform poorly on a simple scenario, such as stationary image inputs and simple rigid body motion. Included below is a systematic evaluation of the noise floor level, rigid body motion prediction, and the real-life performance of displacement and strain predictions in tensile tests. The results are directly compared with commercial DIC software.

Figure 15A:
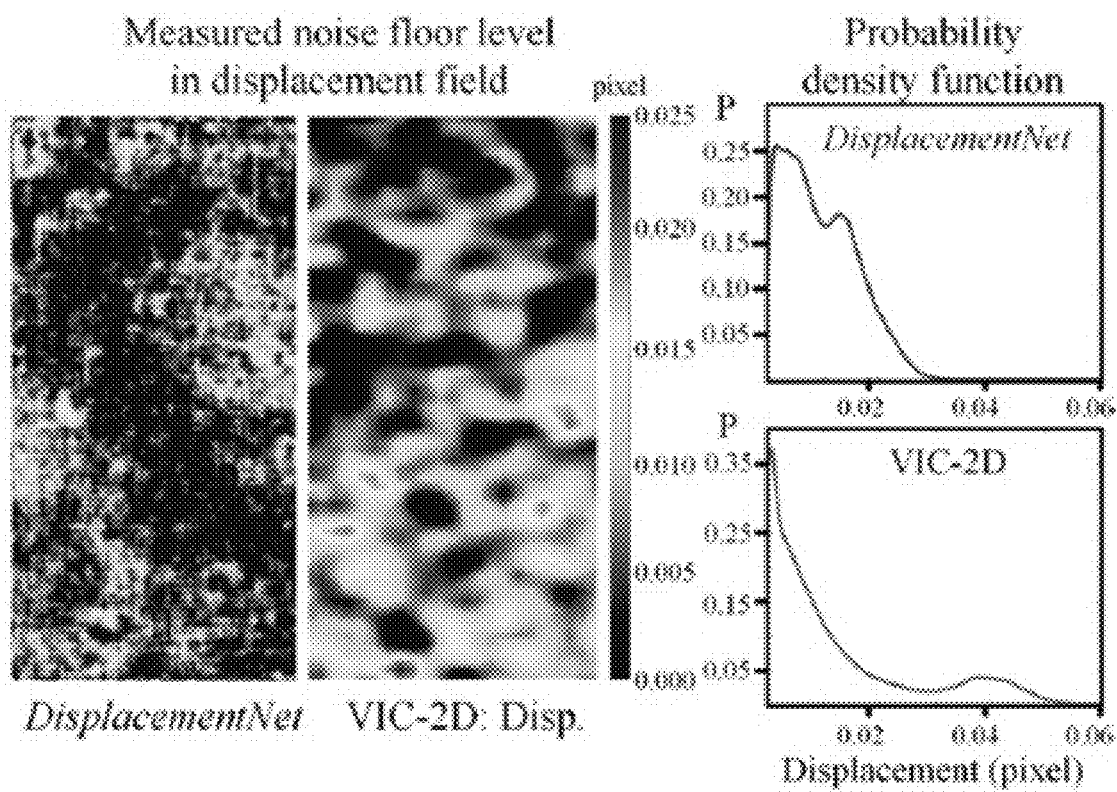
FIG. 15A is a comparison of noise floor measurement of in the displacement field using the proposed system and VIC-2D in accordance with an illustrative embodiment.
Figure 15B:
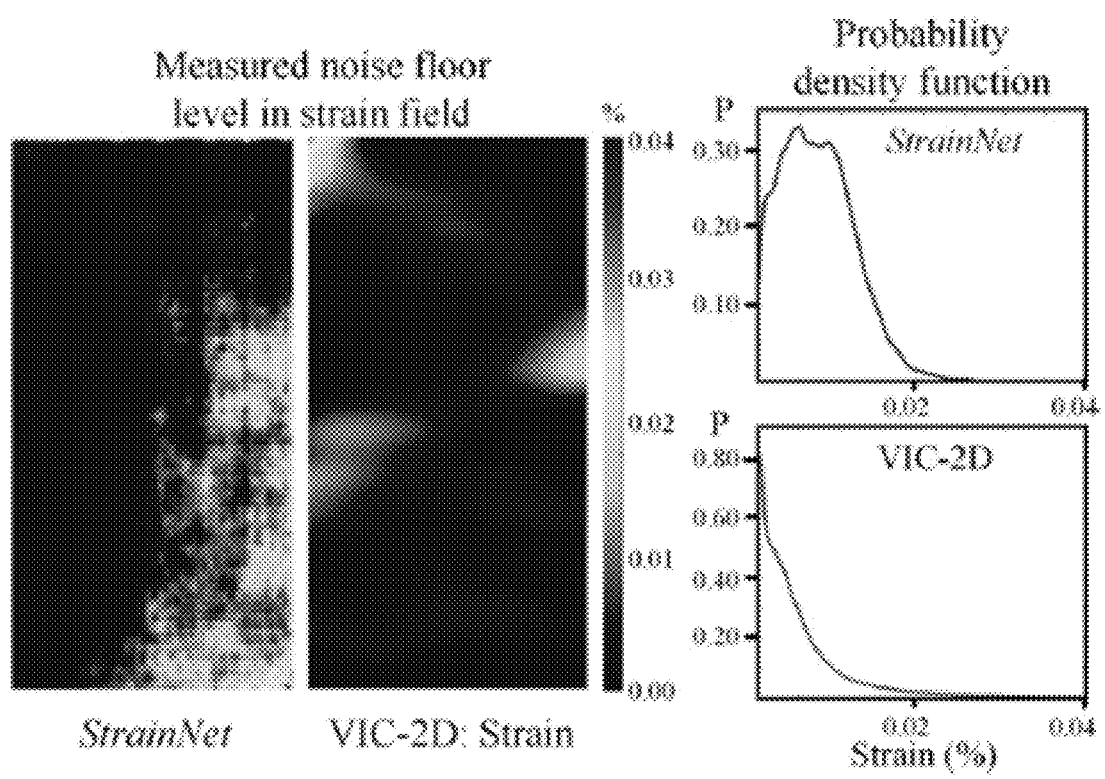
FIG. 15B is a comparison of noise floor measurement of in the strain field using the proposed system and VIC-2D in accordance with an illustrative embodiment.

The inventors first experimentally evaluated the noise floor of the proposed system and compared the results with those obtained from VIC-2D. Twenty-one pairs of stationary speckle images were captured using a CMOS camera (MQ022MG-CM, Ximea, Germany) and a telecentric lens with a fixed working distance of 139 mm and a magnification ratio of 0.3× (#58-428, Edmund Optics, USA). The image pairs were fed to both DisplacementNet and StrainNet. FIG. 15 depicts a predicted example with the probability density distributions. Specifically, FIG. 15A is a comparison of noise floor measurement of in the displacement field using the proposed system and VIC-2D in accordance with an illustrative embodiment. FIG. 15B is a comparison of noise floor measurement of in the strain field using the proposed system and VIC-2D in accordance with an illustrative embodiment. The theoretical outputs of displacement and strain fields should be zero and uniform. Deep DIC performs better in terms of the noise floor of displacement prediction as compared with VIC-2D. VIC 2D shows a slightly smaller noise floor in the strain field prediction.

FIG. 16 is a table that summarizes the statistical analysis of all 21 measurements for the noise floor level comparison in accordance with an illustrative embodiment. DisplacementNet has an average noise floor of 0.0094 pixel (with a standard deviation of 0.065 pixel) in the displacement prediction, which is slightly better than the commercial DIC software. StrainNet has an average noise floor of 0.0073% strain (with a standard deviation of 0.0045%), which is on par with the commercial solution. It should be noted that usually the noise floor level is not evaluated for the strain prediction, since it is derived from the displacement field. However, since the strain prediction in the proposed system is independent of the displacement prediction, it is meaningful to evaluate its noise floor level.

The inventors also validated performance of the proposed system on simple rigid body translational motion. A sample with speckle patterns was clamped only on the moving side of a miniature universal material test system (μts, Psylotech Inc., USA), which has a 25 nanometer (nm) displacement resolution. Nineteen step motions with a step size of 35 micrometers (μm) in the vertical direction were commanded to move the sample without stretching it. The same camera and lens system was adopted from the noise floor measurement to capture the sample image after each step motion. A total of 20 images including the starting position were analyzed. FIG. 17A is a plot of predicted final displacement field when validating the system for simple rigid body translational motion in accordance with an illustrative embodiment. The ideal output should be a uniform field. By averaging the whole displacement field, one can take the average value as the predicted translational motion.

Figure 17B:
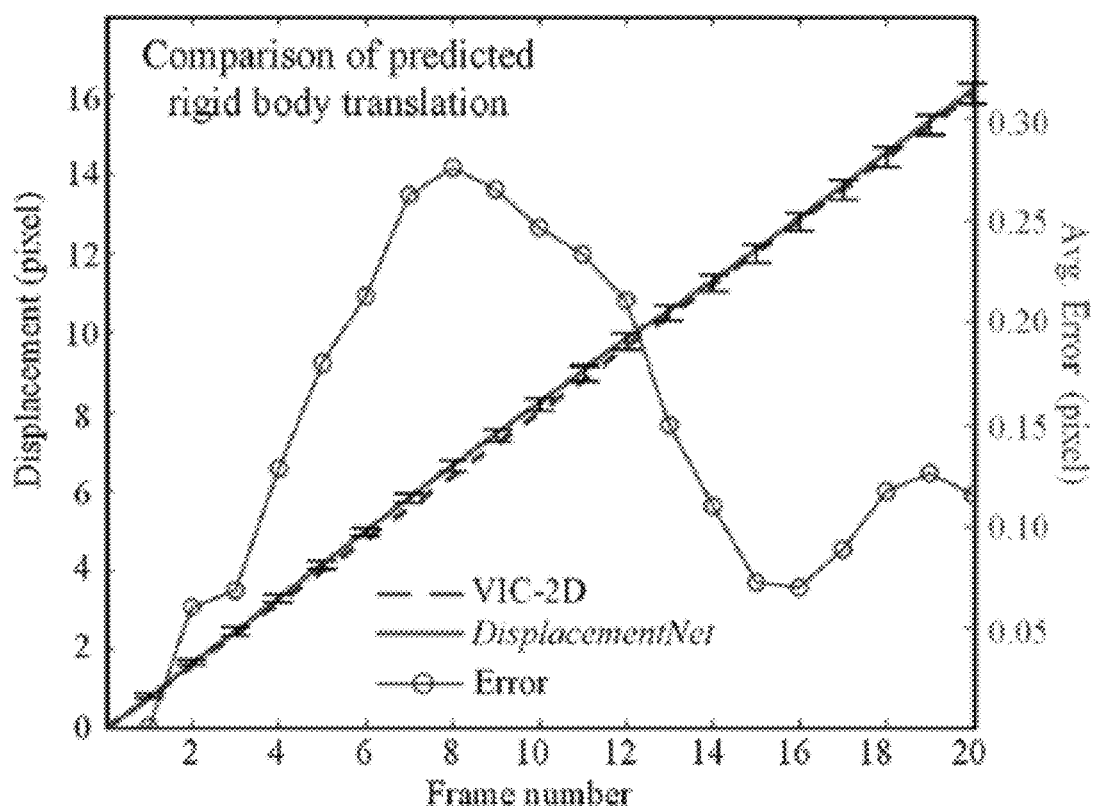
FIG. 17B is a comparison the predicted translational motion from DisplacementNet with VIC-2D in accordance with an illustrative embodiment.

FIG. 17B is a comparison the predicted translational motion from DisplacementNet with VIC-2D in accordance with an illustrative embodiment. The error bar in the figure indicates the maximum difference within the predicted displacement field for each frame. The difference between DisplacementNet and VIC-2D is plotted as the error curve in FIG. 17B. The maximum difference is 0.275 pixels in the 8th frame.

DisplacementNet performs less impressive in this test. It produces non-uniform displacement predictions and noticeable differences from VIC-2D results. This is largely attributed to the lack of pure rigid body motion samples in the training dataset. Based on how the random displacement fields are defined according to Equations 1 and 2, no uniform displacement field is included in the dataset. By adding additional data samples with pure translation and/or rotation will help to improve the performance of DisplacementNet in predicting rigid body motion. On the other hand, the performance of the proposed system in this task does not indicate its ability to handle complex deformation situations due to the nature of deep learning.

Figure 18A:
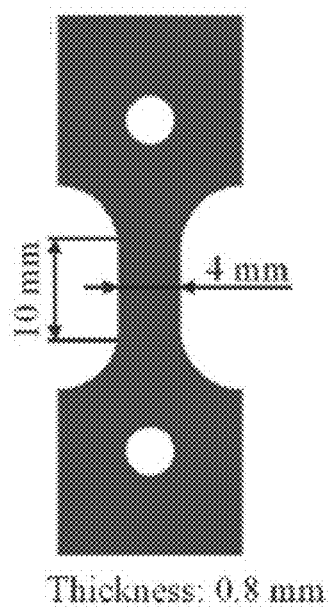
FIG. 18A depicts a test sample made of Bronze 220 and its dimensions in accordance with an illustrative embodiment.
Figure 18B:
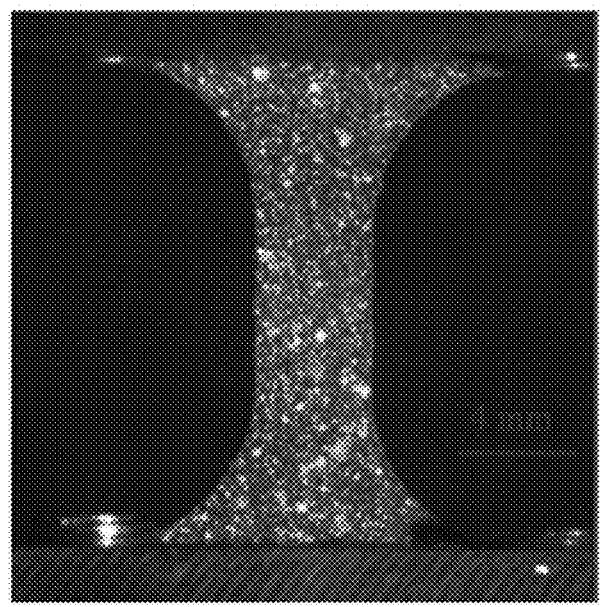
FIG. 18B depicts an example of a captured image during the test of the Bronze 220 in accordance with an illustrative embodiment.

In another example, the inventors tested the performance of the proposed system on real image sequences captured from tensile testing of a bronze sample. The tensile testing setup was conducted with a miniature universal material test system (μts, Psylotech Inc., USA), a CMOS camera (MQ022MG-CM, Ximea, Germany) and lens with a fixed working distance of 139 mm and a magnification ratio of 0.3× (#58-428, Edmund Optics, USA). The test sample was made of Bronze 220 and prepared to a dog-bone shape by waterjet cutting. FIG. 18A depicts a test sample made of Bronze 220 and its dimensions in accordance with an illustrative embodiment. The test piece was fixed at one end and pulled at the other end at a constant speed of 12 μm/s until fracture. FIG. 18B depicts an example of a captured image during the test of the Bronze 220 in accordance with an illustrative embodiment. A total of 189 images were collected from the tensile test and fed to both Deep DIC (DisplacementNet and StrainNet) and VIC-2D for comparison. The predicted displacement and strain fields for three representative frames were plotted, and their performance was compared.

Figure 19:
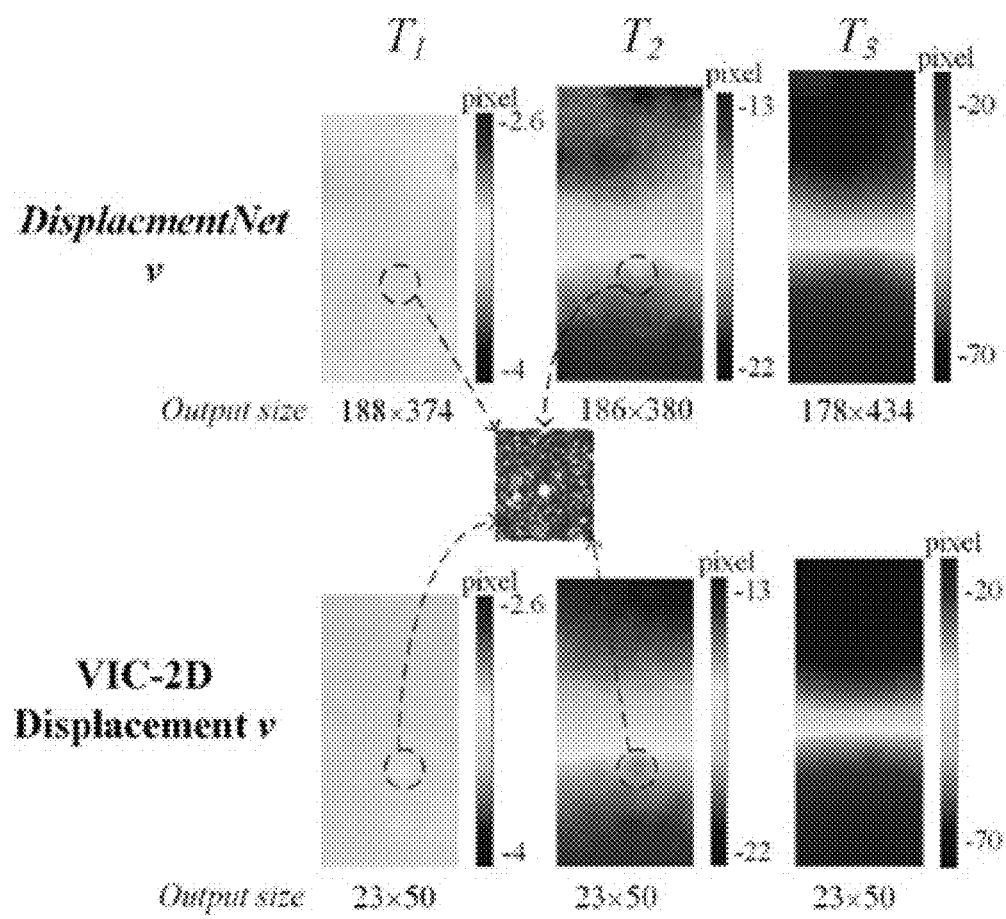
FIG. 19 is a comparison of displacement predictions from DisplacementNet and VIC-2D for tensile testing on the bronze sample in accordance with an illustrative embodiment.
Figure 20:
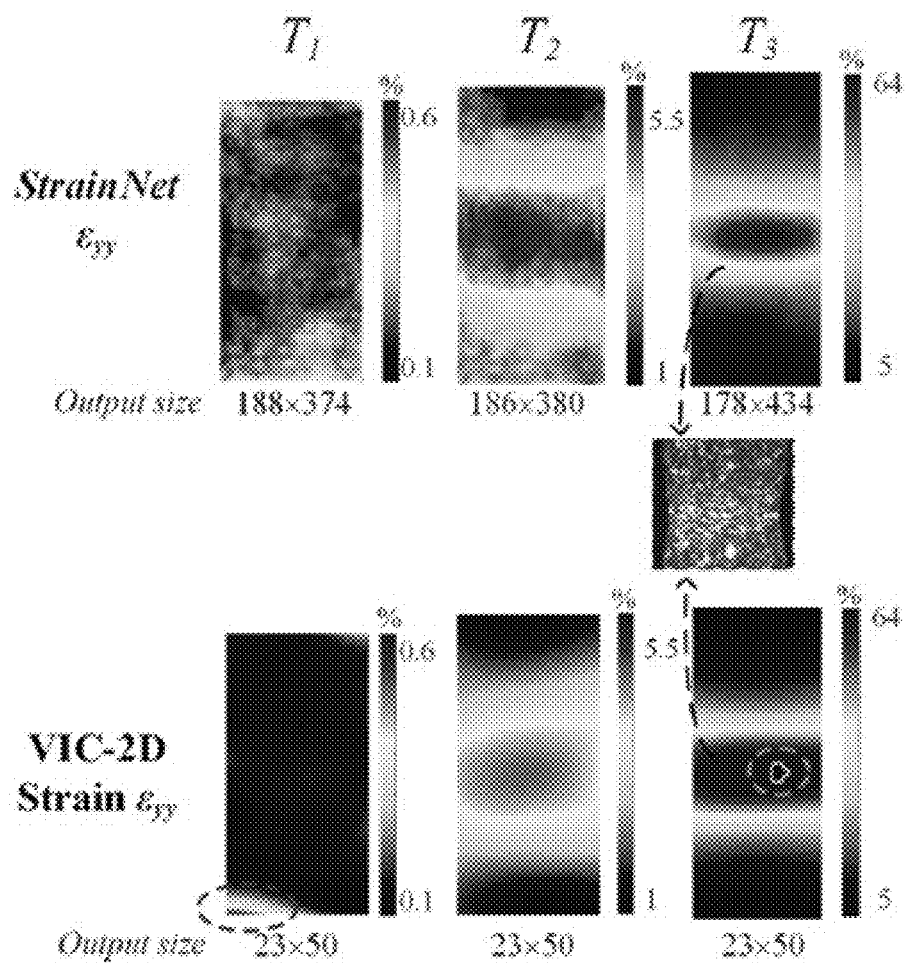
FIG. 20 is a comparison of strain predictions from StrainNet and VIC-2D for tensile testing on the bronze sample in accordance with an illustrative embodiment.

FIG. 19 is a comparison of displacement predictions from DisplacementNet and VIC-2D for tensile testing on the bronze sample in accordance with an illustrative embodiment. FIG. 20 is a comparison of strain predictions from StrainNet and VIC-2D for tensile testing on the bronze sample in accordance with an illustrative embodiment. The first frame at T1 corresponds to the early stage when the deformation just starts. The second frame at T2 is after yielding when localized deformation can be observed. The third frame at T3 is towards the end of the experiment when the speckle patterns on the sample start to tear due to the crack initiation. The proposed system adaptively tracks the ROI, which starts at a size of 188×374 and ends at 178×434. The output resolution for both displacement and strain fields is the same as the input image size, so the local deformation variation can be better captured. For VIC-2D, the program was run using incremental correlation for a more stable prediction of large deformation. The subset and step sizes are set according to the suggested values by the software as 29 and 7, respectively. The output size from VIC-2D is about ⅐ of the original image size, thus giving an output size of 23×50, which stays the same for all predictions. The VIC-2D results presented in FIGS. 19 and 20 are interpolated to match the size of Deep DIC results for a direct comparison. Though VIC-2D results appear to be smoother in some predictions, it is not due to a better prediction accuracy but the interpolation operations.

The displacement prediction in the vertical direction is compared in FIG. 19. Overall, one can observe very consistent and comparable displacement field predictions from DisplacementNet and VIC-2D. The absolute magnitude and the spatial distribution both match well. For time instances T1 and T2, VIC-2D results show clear quality fluctuations due to a large white spot in the speckle image as indicated in the figure inset. DisplacemetNet is less affected by the pattern variation given the inclusion of different quality speckle images in the training set. The prediction of strain component $\varepsilon_{yy}$ is compared in FIG. 20. Again, the overall magnitudes and spatial patterns match quite well between the two predictions. StrainNet shows larger noises in the small strain prediction at T1, which is consistent with the noise floor level measurement. The circled areas in VIC-2D results at T1 and T3 show invalid predictions around edges and at the locations with very large deformation that the speckle patterns start to break, while StrainNet still produces reasonable results at these locations. This is one of the most significant advantages of StrainNet, where it is more robust than traditional DIC to handle different pattern variations even with edges and torn speckle patterns. These situations are more prevalent in testing polymer materials with extremely large strain. In addition, StrainNet shows better spatial resolution to capture the localized strain concentration at the center of the sample in frame T3, which matches the optical observation better as illustrated in the figure inset.

It is also worth considering the achievable resolution and computation time for the proposed system and VIC-2D. The subset and step sizes in traditional DIC affect the output resolution and computation time. The subset size needs to be big enough to include sufficient pattern features for correlation, but also affects the spatial resolution. The step size directly controls the output size and affects the computation time by an inverse square relationship. That is to say, halving the step size will quadruple the calculation time. In Deep DIC, for both DisplacementNet and StrainNet, the prediction is performed on the pixel level, so the output image size will always equal the input image size. The computation time is scaled with the image input size, but not affected by the output resolution and speckle pattern quality. There are also fewer knob tuning settings once the model is fully trained. For the above-discussed tensile test example with 189 frames, the calculation time with VIC-2D is about 27 s with a subset size of 29 and a step size of 7 (manually measured with a timer). The proposed system takes only 2.35 s in total to calculate both the displacement and strain fields including image file loading and calculation, which corresponds to 12.5 milliseconds per frame.

Figure 21A:
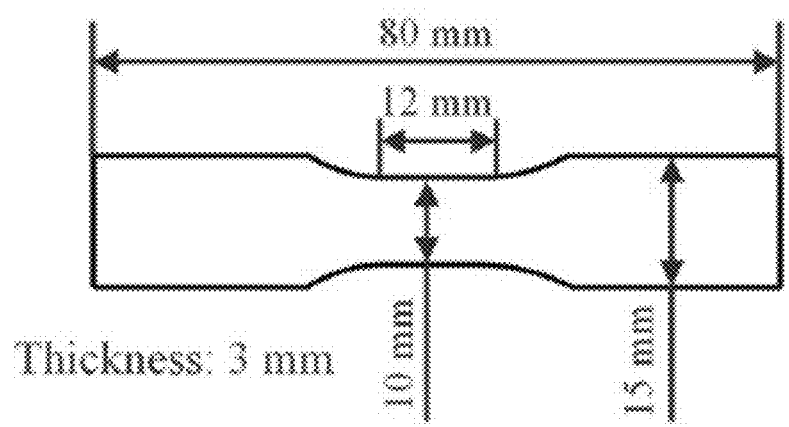
FIG. 21A depicts the dimensions of a polypropylene test sample in accordance with an illustrative embodiment.
Figure 21B:
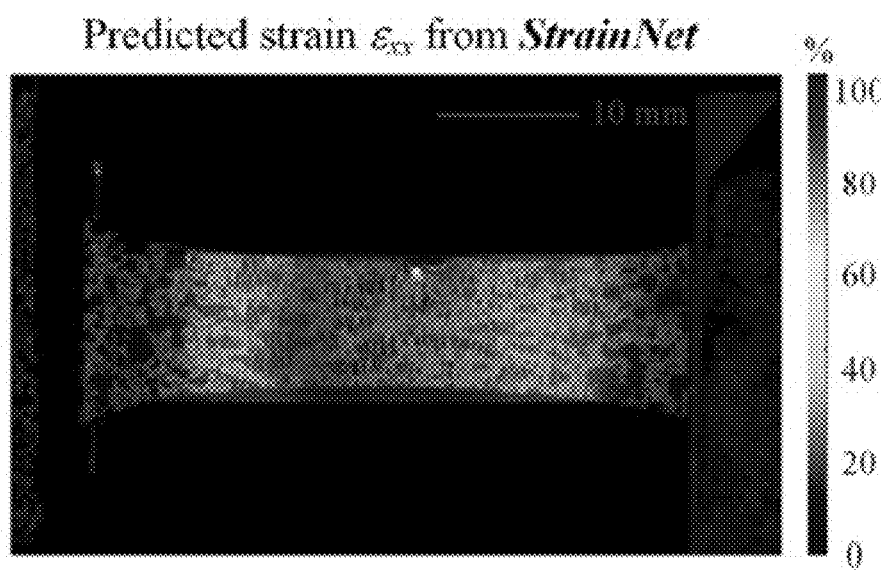
FIG. 21B depicts predicted strain from the proposed StrainNet CNN in accordance with an illustrative embodiment.
Figure 21C:
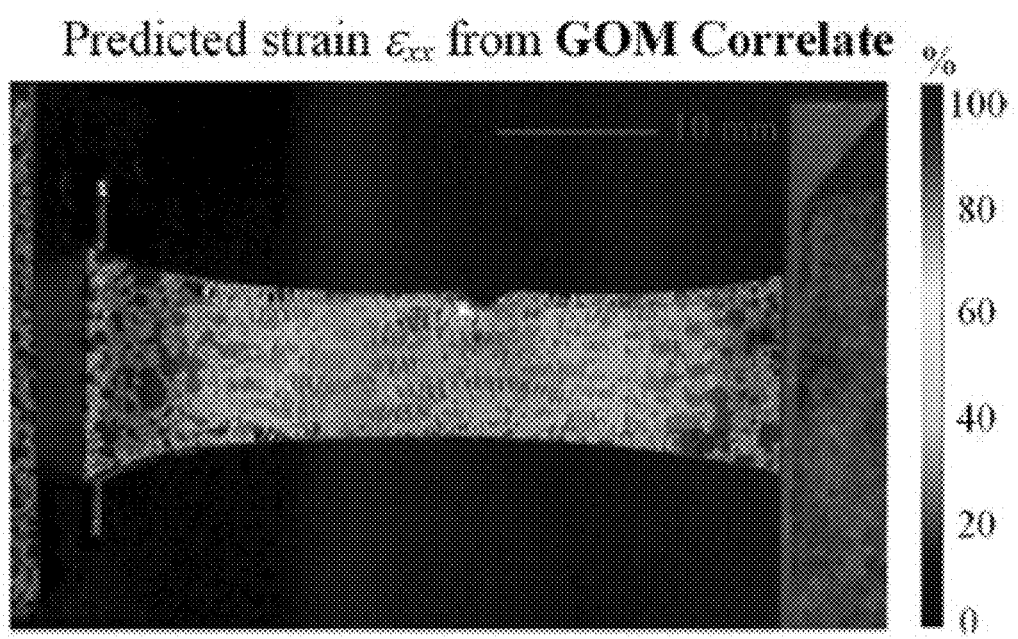
FIG. 21C depicts predicted strain from the GOM Correlate system in accordance with an illustrative embodiment.

In another example, the inventors demonstrated the experimental results of strain prediction for tensile testing on an ultra-stretchable material. In this case, the accumulated strain can go up to more than 100%. A quasi-static tensile test was performed following ISO-8256 standard on a commercial-grade Polypropylene (PP) specimen. FIG. 21A depicts the dimensions of a polypropylene test sample in accordance with an illustrative embodiment. The sample was stretched in the horizontal direction in the tensile test. The DIC measurement was performed using the Aram is 4 M system (GOM Metrology, Germany). A total of 530 images were collected until the fracture of the sample. For GOM Correlate, the subset size and step size of 25 and 5 were used, respectively. The predicted strains from the proposed system were compared with the results obtained from GOM Correlate. Specifically, the x-direction strain $\varepsilon_{xx}$ was plotted and compared. FIG. 21B depicts predicted strain from the proposed StrainNet CNN in accordance with an illustrative embodiment. FIG. 21C depicts predicted strain from the GOM Correlate system in accordance with an illustrative embodiment. As shown in FIGS. 21B and 21C, the predicted strain fields are overlaid on the experimental images for a frame towards the end of the experiment. Very comparable strain distribution and absolute magnitudes was predicted by the two methods. However, the GOM Correlate has many invalid prediction zones, especially around the edges and cracks of the specimen, while StrainNet is quite robust for very large strain prediction and able to give a reasonable full-field prediction.

Figure 22:
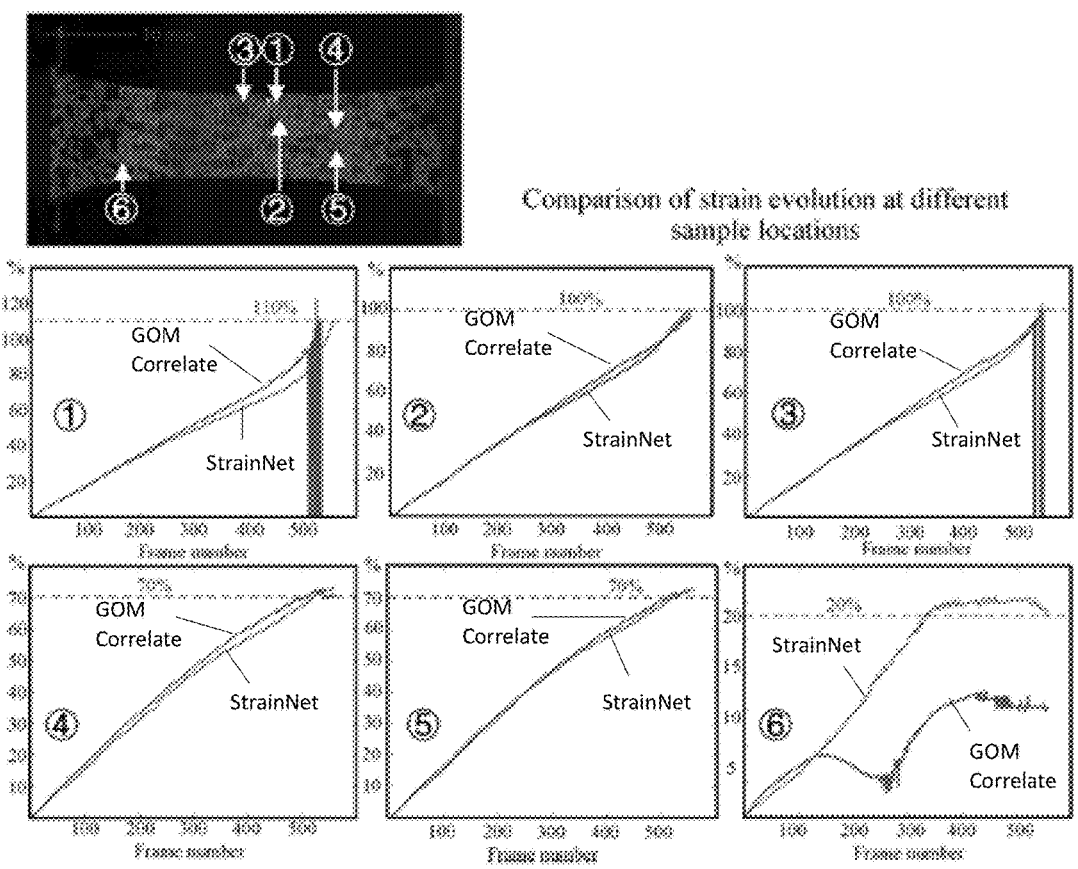
FIG. 22 depicts a point-to-point comparison of predicted strain curves from StrainNet and GOM Correlate in accordance with an illustrative embodiment.

FIG. 22 depicts a point-to-point comparison of predicted strain curves from StrainNet and GOM Correlate in accordance with an illustrative embodiment. Six locations were selected for comparison on the test sample, and were be categorized into three groups depending on the level of deformation. Group 1 (points 1-3) has a cumulative strain large than 100% towards the end of the test. The predicted strain evolutions from StrainNet and GOM Correlate are in good consistency for strain up to 80%. After that, the GOM Correlate results become very unstable and frequently produce invalid values due to very localized deformation and tear of speckle patterns. The performance of traditional DIC is very sensitive to the quality of speckle patterns. StrainNet results are still reliable even with very large deformation. The second group (points 4 and 5) undergoes moderate deformation up to 70% strain, where the strain predictions from the two methods are highly consistent. The third group (point 6) is a very interesting group, which is located close to the clamping region. The strain predictions from the two methods are very different. Though no third strain measurement result is available to objectively quantify the prediction accuracy between the two, the strain curve predicted by StrainNet is more realistic. Since the sample is stretched slowly at a constant speed, point 6 will experience stretching first and a tendency of releasing motion due to the localized deformation observed in the middle region of the sample. The strain prediction of point 6 from GOM Correlate suggests two cycles of stretching and releasing, which is hard to find a plausible mechanics explanation. This additional strain fluctuation around frames 250-300 cannot be noticed in the strain curves from other points (1-5) either.

For a total of 530 frames, the proposed system started with an ROI of 75×178 and ended with a final ROI of 72×317. The total running time, including image loading and calculation of displacement and strain fields, was 13.3 s, corresponding to 25.1 milliseconds per frame on average. For comparison, GOM Correlate took more than 3 min in the calculation (with a subset size 25 and step size 5). The computational efficiency of traditional DIC is significantly influenced by speckle pattern quality as the speed dramatically drops when there is localized large deformation with deteriorated speckle patterns towards the latter frames. The computation speed of the proposed system is quite stable and scaled with the image input size, but was not affected by pattern quality.

Figure 23A:
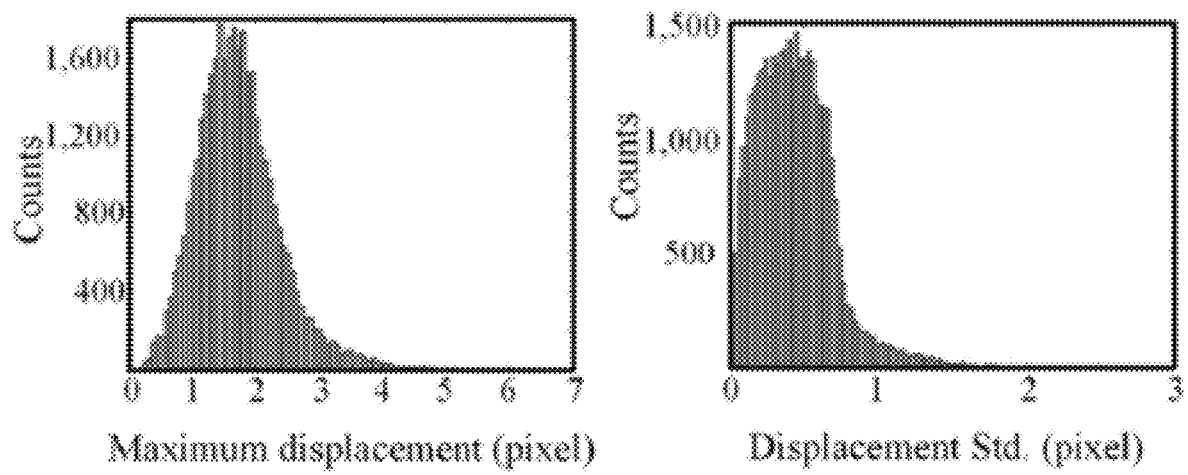
FIG. 23A depicts histograms of displacement distribution in accordance with an illustrative embodiment.
Figure 23B:
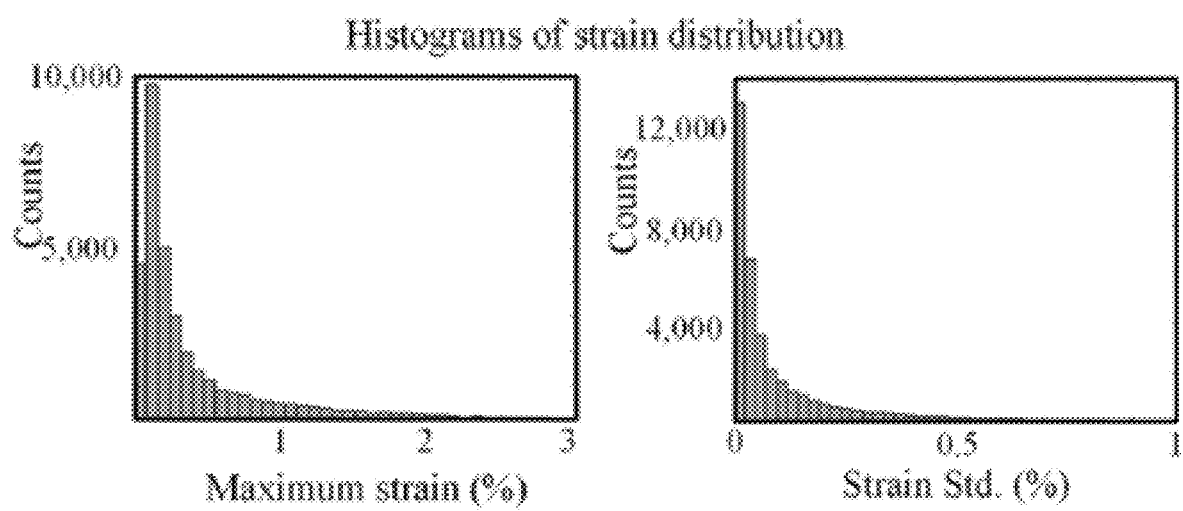
FIG. 23B depicts histograms of strain distribution in accordance with an illustrative embodiment.

The inventors generated 40,150 pairs of specular images and the corresponding ground truths in total. The dataset was divided into a training set of 36,000, a validation set of 4,000, and a test set of 150. A statistical analysis of the displacement and strain distributions in the training dataset was performed to evaluate if the generated data give a good representation of a variety range of displacements and strains. The maximum displacement magnitude and its standard deviation within each sample are first calculated. The statistical distributions of these two variables was plotted for all 36,000 samples of the training set. FIG. 23A depicts histograms of displacement distribution in accordance with an illustrative embodiment. Similarly, the maximum strain magnitude and its standard deviation for all pixel values are calculated for each image. Their statistical distributions in the whole training set were also plotted. FIG. 23B depicts histograms of strain distribution in accordance with an illustrative embodiment. The strain magnitude is taken as the equivalent strain.

Figure 24:
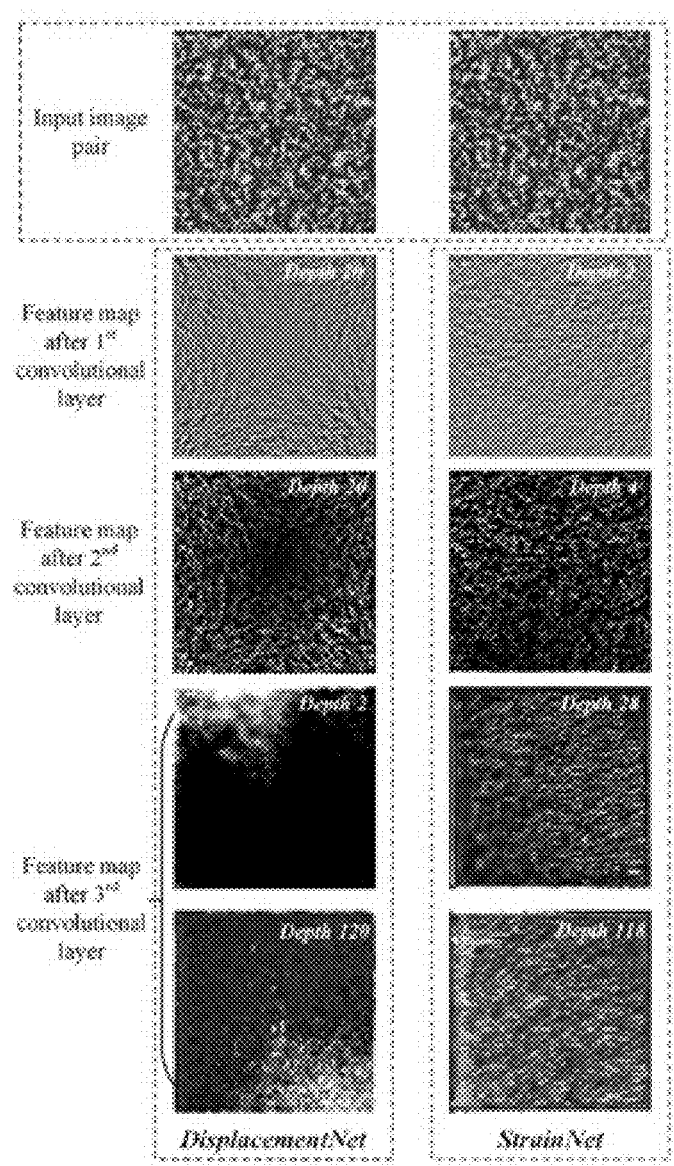
FIG. 24 is a visualization of feature maps of the first three layers in the displacement CNN and the strain CNN in accordance with an illustrative embodiment.

The inventors further analyzed the difference between DisplacementNet and StrainNet by visualizing and comparing the learned features maps in the two CNNs. In the encoder stage, each convolutional layer halves the feature map size but double its depth. Representative features maps from the two CNNs were plotted for the first three convolution operations at different depths. FIG. 24 is a visualization of feature maps of the first three layers in the displacement CNN and the strain CNN in accordance with an illustrative embodiment. The first convolutional layer has a stack of 64 feature maps for both CNNs. The selective feature maps of depth 20 from DisplacementNet and of depth 2 from StrainNet were plotted for comparison. Both CNNs are extracting some low-level features, such as speckle boundaries, in the first convolutional layer. The feature maps of the two CNNs in the second convolutional layer are still topologically similar, but show a large point-to-point variance. Starting from the third layer, the differences between the two start to become more apparent. For DisplacementNet, the feature map becomes localized, which indicates that the CNN tends to extract features from different regions, while StrainNet tends to have more uniformly distributed features. From a physics-based understanding, the strain calculation needs to remove the rigid body translation and rotation, while the displacement calculation only needs to calculate local correlation, so StrainNet utilizes more global information than DisplacementNet.

Figure 25:
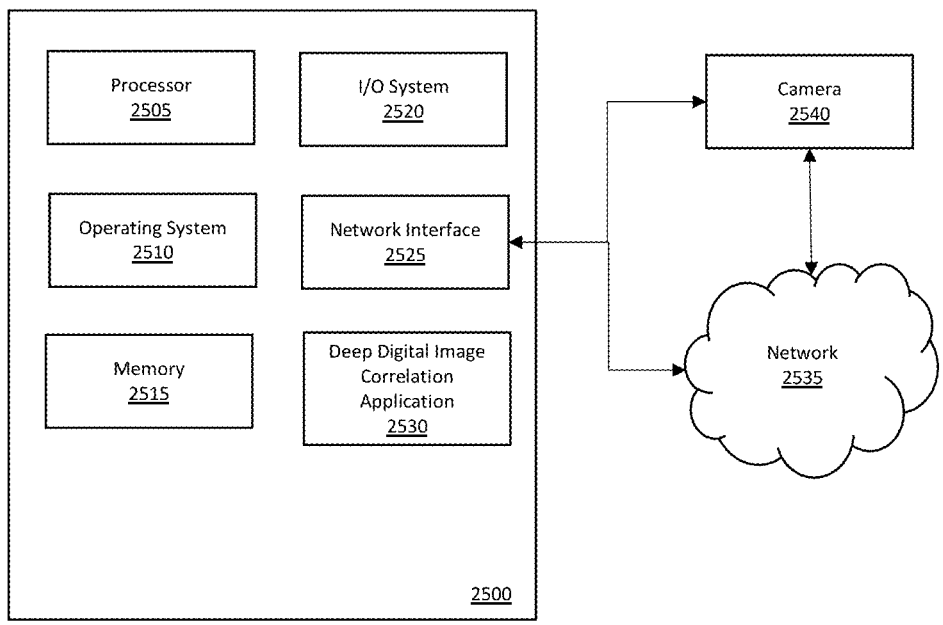
FIG. 25 is a block diagram of a computing system to implement a deep digital image correlation in accordance with an illustrative embodiment.

In an illustrative embodiment, any of the operations described herein can be performed by a computing system that includes a processor, a memory, a user interface, transceiver, etc. Any of the operations described herein can be stored in the memory as computer-readable instructions. Upon execution of these computer-readable instructions by the processor, the computing system performs the operations described herein. FIG. 25 is a block diagram of a computing system 2500 to implement a deep digital image correlation in accordance with an illustrative embodiment.

The computing system 2500 is in communication with a network 2535 and a camera 2540. The computing system 2500 can communicate directly with the camera 2540 or indirectly through the network 2535. The camera 2540 can be any type of camera that is able to capture images for use in digital image correlation. In one embodiment, the computing system 2500 may be incorporated into the camera 2540. The computing system 2500 includes a processor 2505, an operating system 2510, a memory 2515, an input/output (I/O) system 2520, a network interface 2525, and a deep digital image correlation application 2530. In alternative embodiments, the computing system 2500 may include fewer, additional, and/or different components.

The components of the computing system 2500 communicate with one another via one or more buses or any other interconnect system. The computing system 2500 can be any type of networked computing device. For example, the computing system 2500 can be a smartphone, a tablet, a laptop computer, a dedicated device specific to the DIC application, etc.

The processor 2505 can be in electrical communication with and used to control any of the system components described herein. The processor 2505 can be any type of computer processor known in the art, and can include a plurality of processors and/or a plurality of processing cores. The processor 2505 can include a controller, a microcontroller, an audio processor, a graphics processing unit, a hardware accelerator, a digital signal processor, etc. Additionally, the processor 2505 may be implemented as a complex instruction set computer processor, a reduced instruction set computer processor, an x86 instruction set computer processor, etc. The processor 2505 is used to run the operating system 2510, which can be any type of operating system.

The operating system 2510 is stored in the memory 2515, which is also used to store programs, user data, network and communications data, peripheral component data, the deep digital image correlation application 2530, and other operating instructions. The memory 2515 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 2520 is the framework which enables users and peripheral devices to interact with the computing system 2500. The I/O system 2520 can include one or more displays (e.g., light-emitting diode display, liquid crystal display, touch screen display, etc.), a speaker, a microphone, etc. that allow the user to interact with and control the computing system 2500. The I/O system 2520 also includes circuitry and a bus structure to interface with peripheral computing devices such as power sources, USB devices, data acquisition cards, peripheral component interconnect express (PCIe) devices, serial advanced technology attachment (SATA) devices, high definition multimedia interface (HDMI) devices, proprietary connection devices, etc.

The network interface 2525 includes transceiver circuitry (e.g., a transmitter and a receiver) that allows the computing system to transmit and receive data to/from other devices such as the camera 2540, other remote computing systems, servers, websites, etc. The data received from the camera 2540 can include a plurality of captured images, image metadata, etc. The network interface 2525 enables communication through the network 2535, which can be one or more communication networks. The network 2535 can include a cable network, a fiber network, a cellular network, a wi-fi network, a landline telephone network, a microwave network, a satellite network, etc. The network interface 2525 also includes circuitry to allow device-to-device communication such as Bluetooth® communication.

The deep digital image correlation application 2530 can include software and algorithms in the form of computer-readable instructions which, upon execution by the processor 305, performs any of the various operations described herein such as receiving captured images, processing captured image data, determining a region of interest, updating the region of interest, using strain and displacement CNNs to process the images, performing any of the encoder/decoder operations, determine an amount of displacement or deformation of a sample, etc. The deep digital image correlation application 2530 can utilize the processor 2505 and/or the memory 2515 as discussed above. In an alternative implementation, the deep digital image correlation application 2530 can be remote or independent from the computing system 2500, but in communication therewith.

Thus, described herein is a novel deep learning-based DIC method, Deep DIC (or the proposed system), for end-to-end measurement of displacement and strain fields for material testing applications. Two CNNs, Displacement-Net and StrainNet, were developed to separately predict the displacement and strain fields from a pair of speckle images and to work collaboratively to adaptively update the ROI for tracking large deformation. To minimize the training cost, the inventors developed a new method to generate a realistic and comprehensive training dataset including the reference and deformed speckle images, and the ground truths of predefined displacement and strain fields. The real-life performance of Deep DIC, including noise floor, rigid body motion tracking, strain measurement in tensile tests, etc., was systematically evaluated.

Compared with other deep learning-based DIC methods, the proposed system utilizes a separate CNN, StrainNet, to achieve direct strain predictions from the image inputs, independent of the displacement measurement. The direct strain prediction from StrainNet avoids the large noises and errors induced by the discontinuity in the predicted displacement field. It preserves the high spatial resolution of strain prediction and does not require any post-filtering. In addition, StrainNet implicitly removes the influences of rigid body translation and motion from the strain calculation through a deep neural network. Additionally, a new dataset generation method was developed to synthesize a realistic and comprehensive dataset, which critically affects the final performance of Deep DIC. To improve the model robustness, both high- and low-quality speckle patterns are generated to simulate the experimental conditions and image capture noises. Comprehensive and realistic deformation cases were included in the dataset, including rigid body translation and rotation, uniform stretch/compression, shear, and localized deformation formulated with 2D Gaussian functions. Though Deep DIC is only trained on purely synthetic data, it achieves good performance on both simulated and experimental data. Compared with commercial DIC software, Deep DIC is able to (1) give highly consistent and comparable displacement and strain predictions for small and moderate deformation; (2) outperform commercial software in terms of robustness for strain predictions with large localized deformation and/or torn speckle patterns; and (3) achieve more consistent and faster computation time down to the milliseconds level.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for correlating image data, the system comprising:
   a memory configured to store a sequence of images of a sample;
   a processor operatively coupled to the memory and configured to:
   crop a first pair of images to specify a region of interest in the first pair of images, wherein at least one image in the pair of images is from the sequence of images;
   calculate, using a first convolutional neural network, a displacement field for the first pair of images;
   calculate, using a second convolutional neural network, a strain field for the first pair of images; and
   determine an amount of displacement or deformation of the sample based at least in part on the displacement field and the strain field, wherein the processor is configured to use the displacement field to generate two image outputs, and wherein each of the two image outputs has a size of h×w.

2. The system of claim 1, wherein the strain field is calculated independent of the displacement field.

3. The system of claim 1, wherein the first pair of images includes a reference image and a deformed image, wherein the deformed image is a deformed version of the reference image.

4. The system of claim 3, wherein the processor generates the deformed image by warping the reference image.

5. The system of claim 1, wherein the processor is configured to determine an updated region of interest based at least in part on the calculated displacement field.

6. The system of claim 5, wherein the processor is configured to determine the updated region of interest based on updated coordinates of four corner points in the displacement field such that the updated region of interest tracks a deformation of the sample.

7. The system of claim 5, wherein the processor is configured to crop a second pair of images using the updated region of interest.

8. The system of claim 7, wherein the processor is further configured to:
   calculate, using the first convolutional neural network, an updated displacement field for the second pair of images;
   determine a subsequent updated region of interest based at least in part on the updated displacement field for the second pair of images; and
   crop a third pair of images using the subsequent updated region of interest.

9. The system of claim 1, wherein the system is trained with one or more synthetic datasets.

10. The system of claim 1, wherein the processor is configured to use the strain field to generate three image outputs, wherein each of the three image outputs has a size of h×w, and wherein each of the three image outputs includes a plane strain component.

11. A method for correlating image data, the method comprising:
   storing, in a memory of a computing system, a sequence of images of a sample;
   cropping, by a processor operatively coupled to the memory, a first pair of images to specify a region of interest in the first pair of images, wherein at least one image in the pair of images is from the sequence of images;
   calculating, by the processor and using a first convolutional neural network, a displacement field for the first pair of images;
   calculating, by the processor and using a second convolutional neural network, a strain field for the first pair of images;
   determining, by the processor, an amount of displacement or deformation of the sample based at least in part on the displacement field and the strain field; and
   generating, by the processor using the displacement field, two image outputs, wherein each of the two image outputs has a size of h×w.

12. The method of claim 11, wherein calculating the strain field comprises calculating the strain field independent of the displacement field.

13. The method of claim 11, wherein the first pair of images includes a reference image and a deformed image, and further comprising forming the deformed image by warping the reference image.

14. The method of claim 11, further comprising determining, by the processor, an updated region of interest based at least in part on the calculated displacement field.

15. The method of claim 14, wherein the processor is configured to determine the updated region of interest based on updated coordinates of four corner points in the displacement field such that the updated region of interest tracks a deformation of the sample.

16. The method of claim 14, further comprising cropping, by the processor, a second pair of images using the updated region of interest.

17. The method of claim 16, further comprising:
   calculating, by the processor and using the first convolutional neural network, an updated displacement field for the second pair of images;
   determining, by the processor, a subsequent updated region of interest based at least in part on the updated displacement field for the second pair of images; and
   cropping, by the processor, a third pair of images using the subsequent updated region of interest.

18. The method of claim 11, further comprising training the system with one or more synthetic datasets.

19. The method of claim 11, further comprising:
   generating, by the processor using the strain field, three image outputs, wherein each of the three image outputs has a size of h×w, and wherein each of the three image outputs includes a plane strain component.

* * * * *